United States Patent [19]

Butterworth

[11] 4,369,854

[45] Jan. 25, 1983

[54] PARKING DEVICES FOR VEHICLES

[76] Inventor: Archibald J. Butterworth, 7 Frimley Grove Gardens, Frimley, Camberley, Surrey, England

[21] Appl. No.: 236,080

[22] Filed: Feb. 19, 1981

Related U.S. Application Data

[63] Continuation-in-part of Ser. No. 57,232, Jul. 12, 1979, abandoned, which is a continuation-in-part of Ser. No. 910,049, May 26, 1978, abandoned, which is a continuation-in-part of Ser. No. 783,598, Apr. 1, 1977, abandoned.

[30] Foreign Application Priority Data

Oct. 2, 1975 [GB] United Kingdom ............... 40232/75

[51] Int. Cl.³ .............................................. B60K 25/08
[52] U.S. Cl. .................................................. 180/201
[58] Field of Search ............... 180/201, 199, 200, 202; 280/761

[56] References Cited

U.S. PATENT DOCUMENTS

| | | | |
|---|---|---|---|
| 2,964,118 | 12/1960 | Butterworth | 180/201 |
| 3,120,398 | 2/1964 | Butterworth | 180/199 |
| 3,185,237 | 5/1965 | Butterworth | 180/201 |
| 3,186,308 | 6/1965 | Butterworth | 180/201 |
| 3,202,231 | 8/1965 | Butterworth | 180/201 |
| 3,401,762 | 9/1968 | Butterworth | 180/201 |
| 3,589,461 | 6/1971 | Butterworth | 180/201 |

Primary Examiner—Joseph F. Peters, Jr.
Assistant Examiner—Donn McGiehan
Attorney, Agent, or Firm—Sughrue, Mion, Zinn, Macpeak and Seas

[57] ABSTRACT

A parking device for a motor vehicle comprises a pair of parking rollers rotatably mounted in respective roller mounting members which are connected to respective ends of an extensible power means (e.g. a hydraulic ram) and which are arranged to be transported along respective rails on extension or retraction of the power means, each rail extending from a mounting on the sprung part of the vehicle under the floor of the vehicle downwardly and outwardly to a location adjacent to a respective one of a pair of road wheels of the vehicle, so that extension of the power means causes the assembly of parking rollers, roller mounting members and power means to move bodily from a retracted position clear of the road and adjacent to the upper ends of the rails to an operative position adjacent to the said pair of road wheels, in which operative position the parking rollers take the weight of the adjacent end of the vehicle and enable it to be moved sideways. Preferably the weight of the end of the vehicle is taken through jacking abutments on the unsprung part of the vehicle co-acting with the roller mounting members through pivotally mounted jack-links which swing down on final extension of the power means. The rails may be of round-section rod or wire, but are preferably hollow with a longitudinal slot so as to accommodate a runner attached to the respective roller mounting member.

39 Claims, 36 Drawing Figures

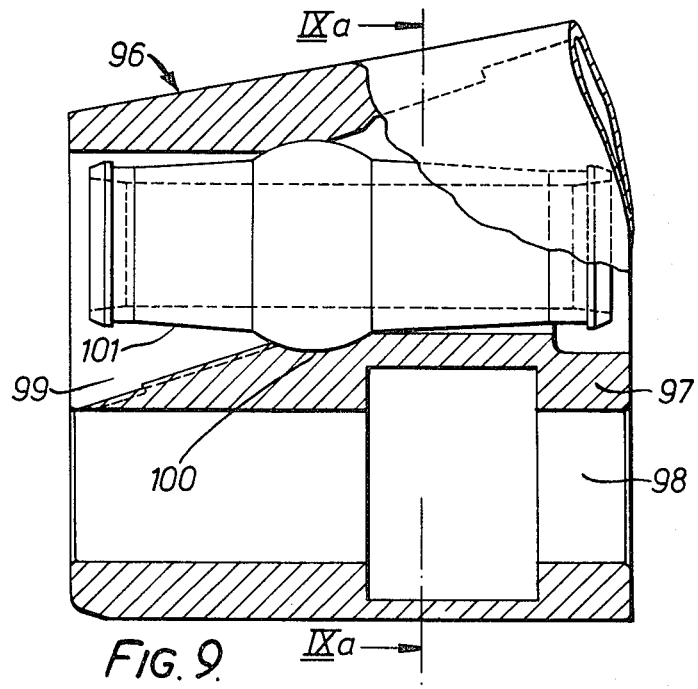
FIG. 9.
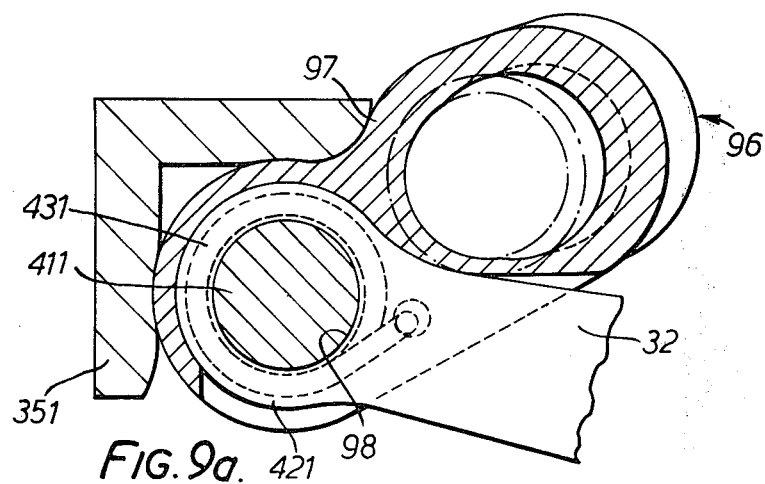
FIG. 9a.
FIG. 10.

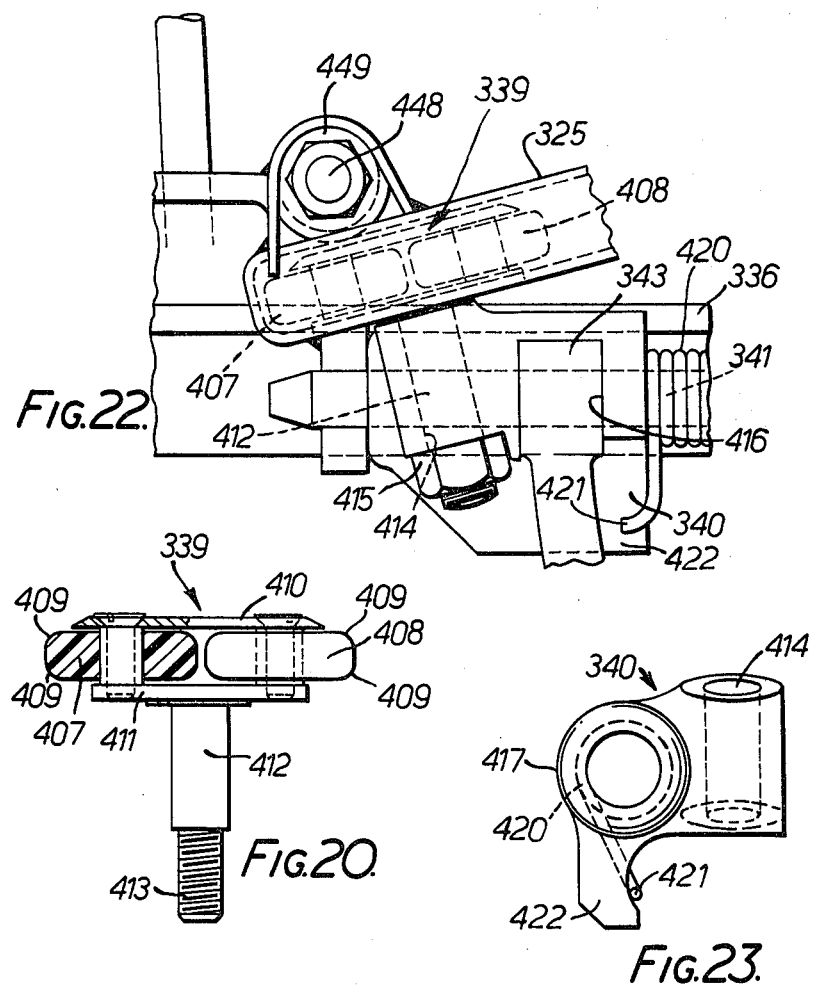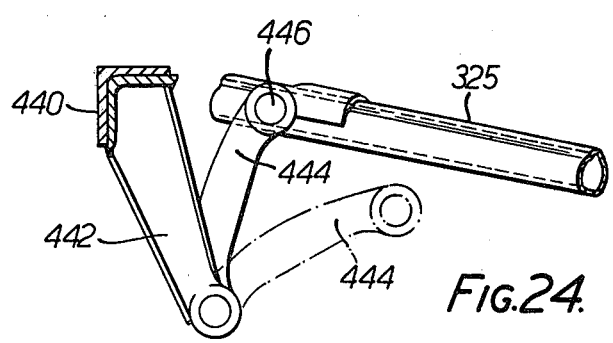

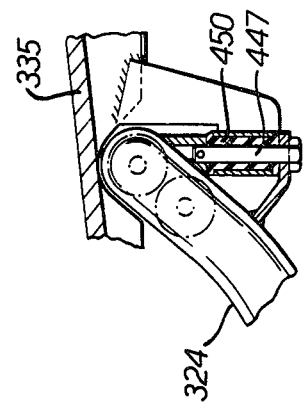
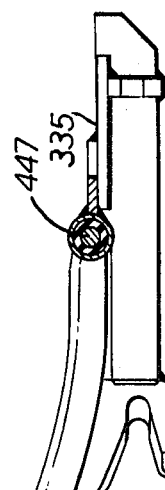
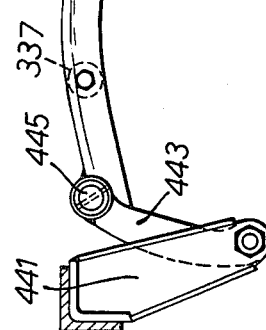

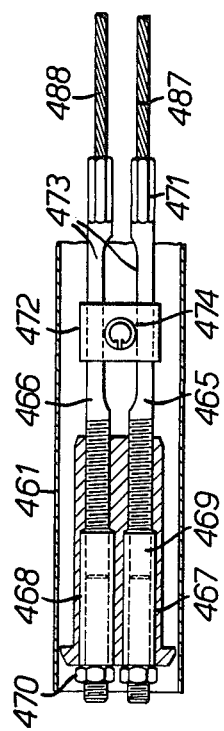
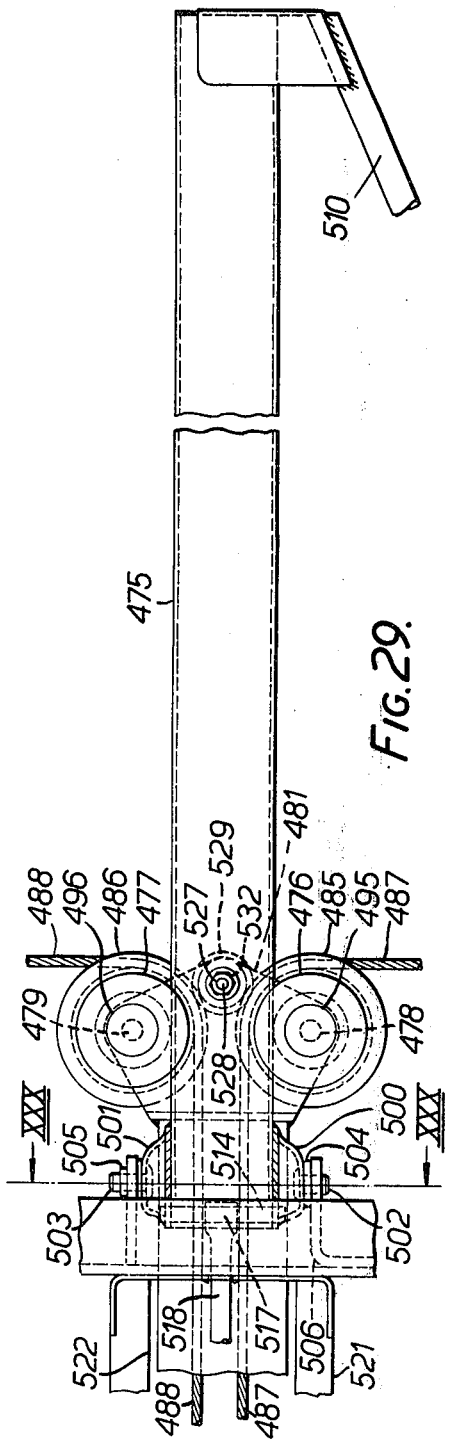
Fig.28.
Fig.29.

PARKING DEVICES FOR VEHICLES

CROSS-REFERENCE TO RELATED APPLICATION

This application is a continuation-in-part of my application Ser. No. 57,232 filed July 12, 1979 now abandoned, which is a continuation-in-part of my application Ser. No. 910,049 filed May 26, 1978 now abandoned, which is a continuation-in-part of my application Ser. No. 783,598 filed Apr. 1, 1977 now abandoned.

BACKGROUND OF THE INVENTION

1. Field of the Invention

This invention relates to parking apparatus for motor road vehicles, of the kind comprising a pair of ground-engaging parking rollers adapted to be mounted on the vehicle so as to be movable from a retracted position beneath the vehicle to an operative position in which they engage the ground one at each side of the vehicle adjacent to a pair of road wheels of the vehicle and cause the said pair of road wheels to be lifted from the ground. The axes of the parking rollers are so disposed that on rotation of the parking rollers in the operative position the adjacent end of the vehicle moves sideways. Power mechanism is provided for moving the parking rollers from the retracted position to the operative position.

2. Description of the Prior Art

In the case of a rear-wheel drive passenger car, the pair of road wheels in question is normally the unsteered driven rear wheels—see for example my U.S. Pat. Nos. 2,964,118 and 3,202,231. In this case, as described in those U.S. Patents, the rollers when in the operative position are preferably oppositely inclined, one ahead of and one behind the centre line of the pair of wheels, and are arranged so as to engage the sides of the tyres of the rear wheels so as to be driven frictionally from them for executing sideways movements, though it would also be possible to employ the present invention with other forms of auxiliary wheel or parking roller, e.g. one driven through a separate transmission or having its own independent power drive. In the case of a front-wheel drive car or of a goods trailer vehicle, the pair of wheels is normally the undriven rear wheels of the car or trailer respectively—see my U.S. Pat. No. 3,120,398. In this case, when the rollers have been lowered, the vehicle is driven through its normal driven wheels and the end supported by the rollers then follows a sideways course dictated by the axes of the rollers.

In my above-mentioned U.S. Patents it was proposed to mount such parking apparatus on an axle carrying the pair of road wheels, i.e. in the first case referred to on the rear axle of the car. This adds somewhat to the unsprung weight of the axle suspension system. It is also impracticable in the case of a car having independent rear wheel suspension and no rigid rear axle.

In my U.S. Pat. No. 3,401,762 I have described and claimed a parking apparatus of the kind described above, in which at least the greater part of the assemblage comprising the rollers, their mountings and the power mechanism is adapted to be carried on the sprung part of the vehicle, and parts carried upon the mountings of the ground-engaging rollers are arranged to engage unsprung parts of the vehicle adjacent to the said pair of wheels towards the end of the movement of the rollers into the lowered position, so as to impart an upward thrust to the said unsprung parts, whereby the said pair of road wheels is lifted from the ground while the weight of the adjacent end of the vehicle is supported by the ground-engaging rollers through the road springs and the said unsprung parts.

In the embodiments described in U.S. Pat. No. 3,401,762, each ground-engaging rollers is rotatably mounted at one end of an arm, the other end of which is adapted to be pivotally connected to the sprung part of the vehicle, so that the arm is capable of swinging the roller from the retracted position to the lowered position and vice versa.

SUMMARY OF THE INVENTION

An object of the present invention is to provide a parking apparatus of the kind described above, retaining the advantage that the greater part of the assemblage is carried on the sprung part of the vehicle, but incorporating an improved mechanism for transporting the rollers from the retracted position to the operative position and vice versa. Subsidiary objects are to enable the transport mechanism to be more simply and economically constructed and fitted to the vehicle.

According to the present invention, a parking device for a motor vehicle comprises a pair of parking rollers rotatably mounted in respective roller mounting members which are connected to respective ends of an extensible power means and which are arranged to be transported along respective rails on extension or retraction of the power means, each rail being adapted to extend from a mounting on the sprung part of the vehicle under the floor of the vehicle downwardly and outwardly to a location adjacent to a respective one of a pair of road wheels of the vehicle, so that extension of the power means will cause the assembly of parking rollers, roller mounting members and power means to move bodily from a retracted position clear of the road and adjacent to the upper ends of the rails to an operative position adjacent to the said pair of road wheels, in which operative position the parking rollers will take the weight of the adjacent end of the vehicle and enable it to be moved sideways. Preferably the weight of the end of the vehicle is taken through jacking abutments on the unsprung part of the vehicle co-acting with the roller mounting members.

In the construction according to the present invention, the whole of the parking mechanism, when in its retracted position, is thus supported on the sprung portion of the vehicle and nothing is added to the axle or road wheel suspension apart from the provision of jacking abutments. The construction can be so arranged that the retracted assembly forms a very shallow and compact unit so that space is easily found for it under modern low-built motor cars, and it can be attached to a car body simply by means of rubber insulated fasteners, without the need for any rigid or accurately located pivots or the like, and without any operating stress or reaction being transmitted back to the car body when the equipment is in operation.

Each rail is preferably adapted to be connected, at its lower and outer end, to a road wheel hub assembly or axle assembly of the vehicle through a pivotal connection allowing for road wheel suspension movements.

Preferably each roller mounting member carries means which engage the respective rail so as to exert a degree of control over the attitude of the parking roller with respect to the rail. Preferably the means which engage the rail are arranged to allow at least a limited movement of the roller mounting member about an axis transverse to the rail and to the axis of the extensible power means, while restraining movement about the axis of the extensible power means. This arrangement, in conjunction with an appropriate disposition of the rail, enables one to ensure that the roller mounting member will approach the respective abutment at the correct angle for co-acting with it.

One of the jacking abutments is preferably provided adjacent to each of said pair of road wheels, on a road wheel hub assembly or axle assembly of the vehicle, and is disposed so that the respective roller mounting member co-acts with the jacking abutment as it approaches the operative position. Each roller mounting member preferably co-acts with the respective jacking abutment through a pivotally mounted jack-link which is normally held in a near-horizontal position by a spring but which can be pivoted to a more nearly vertical position by the final extension of the power means, for taking the weight of the end of the vehicle on the parking rollers. The jack-links can be mounted either on the respective roller mounting members or on the respective road wheel hub assembly or axle assembly.

In a preferred embodiment, each jack-link is pivotally mounted at one end on the roller mounting member and is adapted at its other end to engage the respective jacking abutment, and each of the roller mounting members is connected to the extensible power means by way of a pivotal connection between an intermediate point on each jack-link and a respective end portion of the extensible power means, so that when the end of each jack-link has engaged the respective abutment, the final extension of the power means causes the jack-links to pivot downwards from the respective abutments into the more nearly vertical position and thereby causes the roller mounting members to be swung downwards into the operative position. Each roller mounting member preferably also carries a second pivotal link, pivoted at one end to the roller mounting member and at its other end to an intermediate point on the end portion of the extensible power means, and forming with the said end portion, the jack-link, and the roller mounting member a quadrilateral linkage which controls the attitude of the parking roller in relation to the axis of the extensible power means. These quadrilateral linkages are preferably arranged so that, in the retracted position, the rollers lie substantially horizontal with their axes substantially perpendicular to the axis of the power means, whereas in the operative position the axes of the rollers are tilted in relation thereto, and the tilt which the quadrilateral linkages impart to the roller axes in the operative position is preferably such as to ensure that the vertical planes containing the inclined roller axes meet substantially at the mid-point of the centre line of the other pair of wheels of the vehicle. With this arrangement, the parking rollers can be given the optimum angular position in the operative position, in which they are substantially inclined to the horizontal, (e.g. by 20°) but in the retracted position they lie horizontally under the vehicle and occupy a space of minimum depth.

In an alternative embodiment of the invention, each jack-link is pivotally mounted at one end on the hub or axle assembly for pivotal movement about a substantially horizontal axis extending generally fore-and-aft of the vehicle, the said pivotal mounting thus forming the jacking abutment, and the lower and outer end of the respective rail is pivotally mounted in the other end of said jack-link. In this embodiment, each jack-link and the roller mounting member which engages the respective rail are preferably provided with complementary elements adapted to cooperate as the roller mounting member approaches the operative position.

Each rail may be provided at its upper and inner end with a flexible support adapted to be attached to the vehicle. The rails may be of round-section metal rod or wire.

In a preferred embodiment, however, the rails are of hollow construction with a longitudinal slot running for the full effective length of each rail, and each roller mounting member carries a runner which engages inside the respective rail.

The hollow rails may each have curved sides engaging upper and lower edge portions of the respective runner, and inturned flanges on the lower edges of the sides, said flanges defining said longitudinal slot between them. The mounting of each rail on the sprung part of the vehicle may comprise a generally vertical shackle link whose lower end is pivoted on the sprung part of the vehicle and whose upper end is pivotally connected to the upper and inner end of the rail.

The extensible power means is preferably a hydraulic ram, for example a two-stage hydraulic ram as described in my U.S. Pat. Nos. 3,186,308, 3,185,237, or 3,589,461.

Preferably a single retraction spring is provided for moving the assembly of rollers, roller mounting members and power means from the operative position to the retracted position, the spring having one fixed end and a moving end which is connected through cables to the two roller mounting members so as to synchronize movements of the roller mounting members both on extension and on retraction.

Preferably said moving end of the spring is connected to a carriage movable along a guide which approximately bisects the angle between the rails, each roller mounting member being connected to one end of the guide by a cable which passes around a respective pulley on the carriage.

BRIEF DESCRIPTION OF THE DRAWINGS

In the accompanying drawings:

FIG. 9 is a part sectional view, to a larger scale, of the form of runner and trunnion assembly shown on the off-side (i.e. right-hand side) of the assembly of FIG. 2, FIG. 9a is a section on line IXa—IXa of FIG. 9 of the runner and trunnion assembly showing it engaged with the off-side jack-link and abutment, FIG. 10 is a cross-sectional view of another alternative form of runner for engaging and travelling along the rail, FIG. 20 is an elevational view, partly in section, of the runner for use in the rail of FIGS. 18 and 19.

FIG. 22 is an enlarged detail showing in elevation the lower end of the right-hand rail of FIG. 18, with the jack-link engaging its abutment, FIG. 23 is an elevation of the trunnion which is seen mounted on the jack-shaft in FIG. 22.

FIG. 24 is an elevation of the upper end of the right-hand rail of FIG. 18,

FIG. 25 is an elevation of the left-hand rail of FIG. 18,

FIG. 26 is an enlarged plan view, partly in section, of the lower end of the rail of FIG. 25, FIG. 28 is a sectional plan view through the left-hand end of the spring assembly, FIG. 29 is a plan view of the right-hand end of the spring assembly and the guide bar.

DETAILED DESCRIPTION OF THE INVENTION

Figure 1:
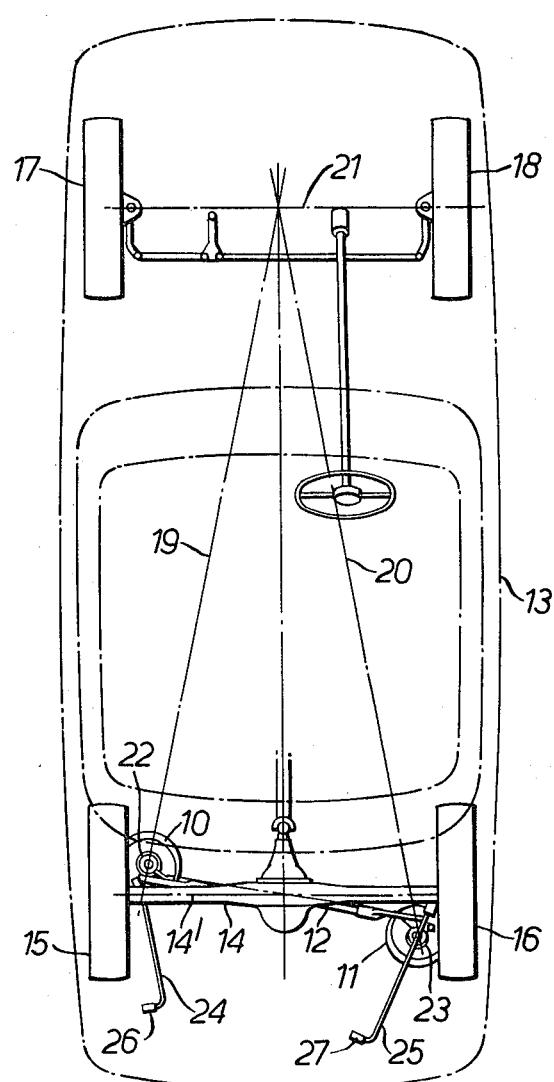
FIG. 1 is a diagrammatic plan view of a rear-wheel drive motor vehicle equipped with a parking device according to the present invention, showing the parking rollers in the operative position.
Figure 1A:
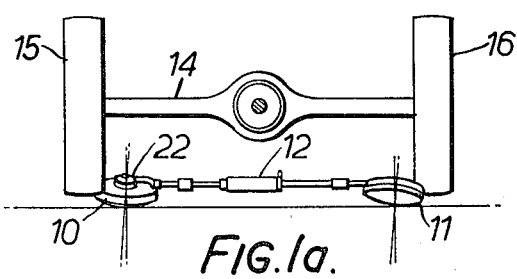
FIG. 1a is a rear elevation of the rear axle and parking device of the vehicle of FIG. 1.

FIG. 1 shows the arrangement of a parking device according to the invention, incorporating parking rollers 10, 11 and an extensible hydraulic ram 12, in a motor car 13 having a driven rear axle 14 with rear wheels 15, 16 and front wheels 17, 18. FIG. 1 illustrates the preferred disposition of the parking rollers in the operative position, in which the left-hand-side parking roller 10 (the near-side in Great Britain) is located forward of the rear axle 14, engaging the side of the tyre on the left-hand (near-side in Great Britain) rear wheel 15, while the right-hand (off-side) parking roller 11 is located behind the axle 14, engaging the tyre of the right-hand (off-side) rear wheel 16. The axes of both rollers 10, 11 are inclined at substantially 20° to the vertical, but in opposite directions, and they are contained in respective vertical planes 19, 20 which converge so as to meet substantially at the mid-point of a line 21 joining the centres of the front wheels 17, 18 of the vehicle. As a consequence of the positioning of the parking rollers, one forward of and one behind the axle 14, the axis of the hydraulic ram 12 lies at approximately $8\frac{1}{2}°$ to the axis 14' of the rear axle 14. The parking rollers 10, 11 are carried by roller mounting members 22, 23 connected to respective ends of the hydraulic ram 12 and are arranged to be transported along respective rails 24, 25 on extension or retraction of the ram 12. The rails 24, 25 extend from flexible mountings 26, 27 which are provided on the sprung part of the car, under the floor, outwards and downwards to locations adjacent to the ends of the axle 14, or to the wheel hubs (not visible in FIGS. 1 and 1a).

Figure 2:
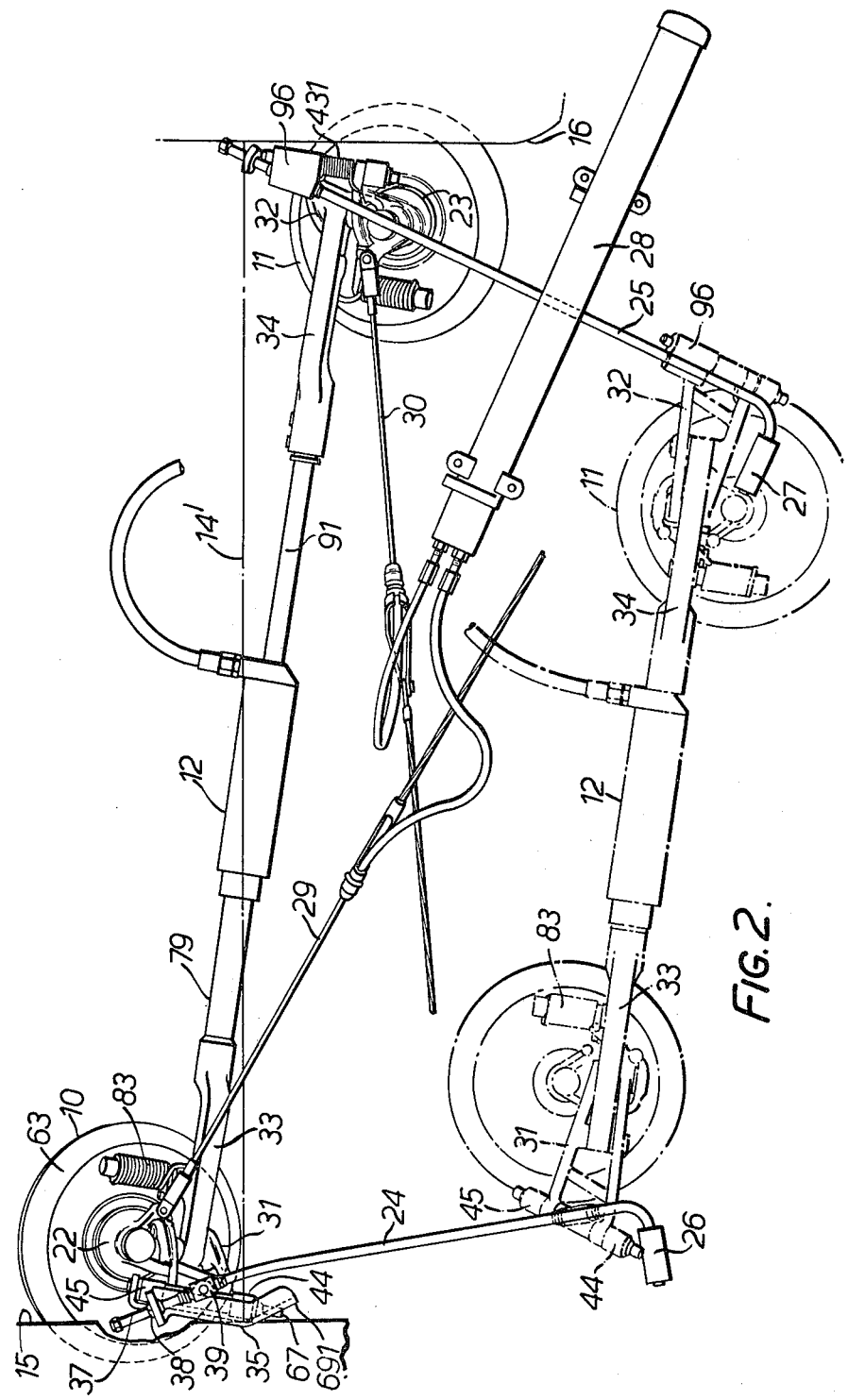
FIG. 2 is a plan view to a larger scale of a parking device according to a first embodiment of the invention, shown in the operative position in full lines and in the retracted position in chain lines.
Figure 3:
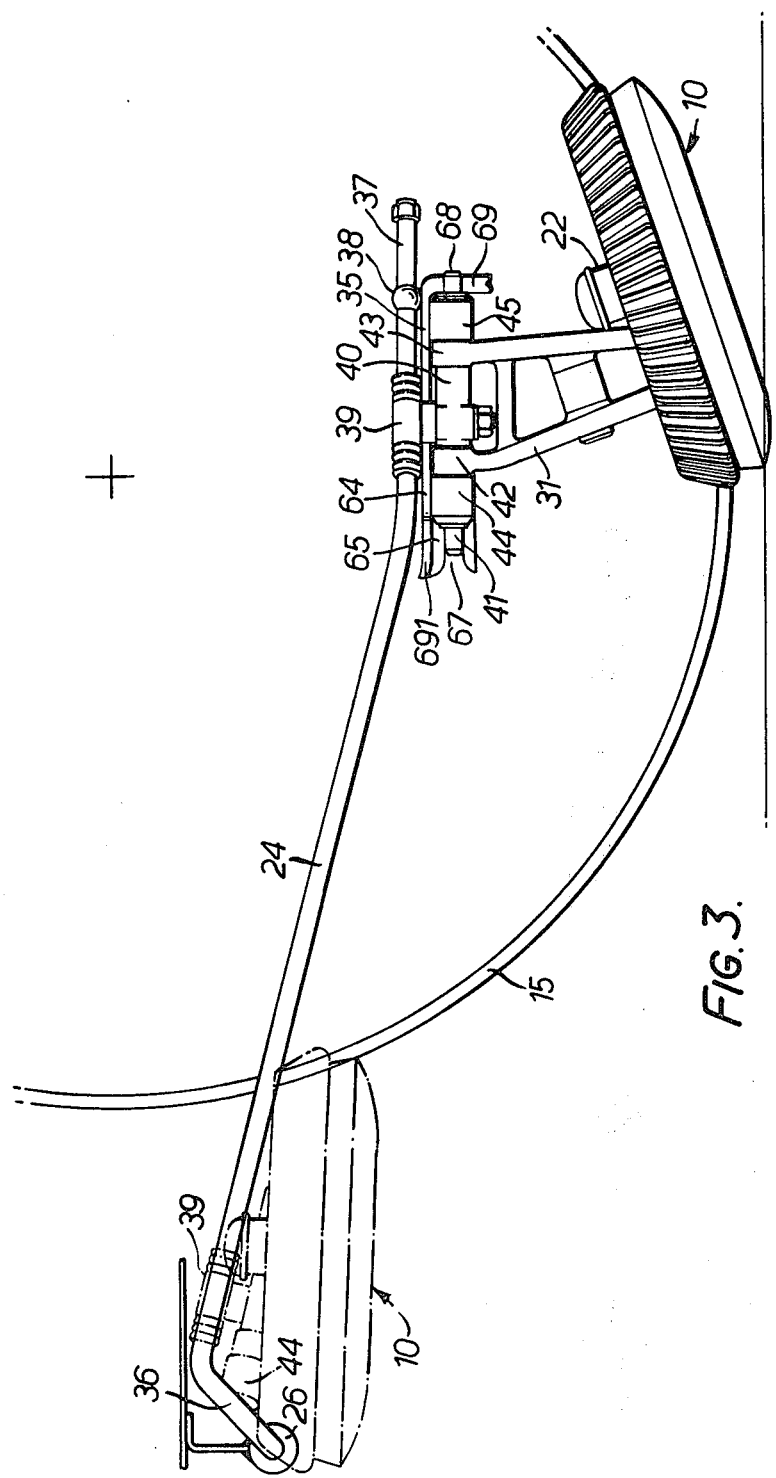
FIG. 3 is an elevational view of the near side parking roller and its rail, shown in the operative position in full lines and in the retracted position in chain lines.
Figure 4:
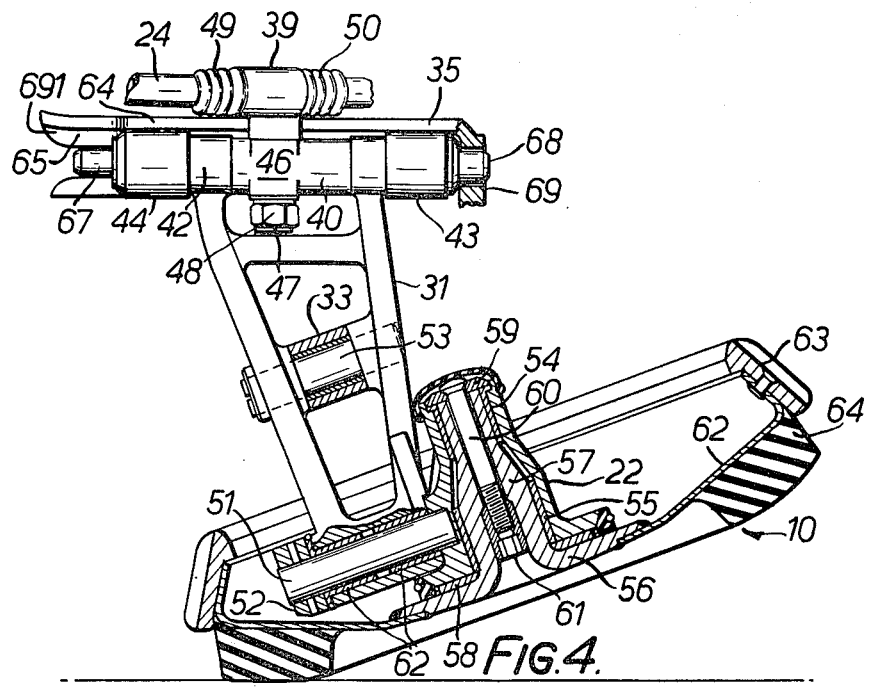
FIG. 4 is a part-sectional elevation of the near side parking roller and its roller mounting member and jack-link, viewed along the axis of the hydraulic ram and seen in the operative position.

FIG. 2 illustrates the parking device to a larger scale and shows a retraction spring assembly 28 (described in more detail below) which is connected to the roller mounting members 22, 23 by respective retraction cables 29, 30. Jack-links 31, 32 are pivoted on the roller mounting members 22, 23 and each jack-link is pivotally connected at an intermediate point to a respective end-extension 33, 34 of the ram 12. FIGS. 2, 3 and 4 also show a jacking abutment 35 which is mounted on the near-side hub member (not shown) at the end of the axle 14, which is indicated in FIG. 2 by its centre line 14'. A similar jacking abutment (not shown) is provided on the off-side. Where the car has no rear axle, e.g. if it has independent rear suspension, the abutment members are mounted on the wheel carriers or other unsprung pads adjacent to the rear wheels.

The rails 24, 25 are of round-section steel rod, e.g. a high tensile steel rod of say $\frac{3}{8}$ inch diameter. The inclination of the rail 24 is shown in FIG. 3. From its flexible mounting 26, an initial cranked section 36 leads into the principal section which is inclined downwards at substantially 15° to the horizontal. The end section 37 is substantially horizontal and is slidably mounted in a spherical bearing 38 on the jacking abutment 35. The cranked section 36 enables the mounting 26 to be located nearer to the level of the axle 14 and thus reduces the relative sliding movement at bearing 38 during normal road wheel suspension movements. The flexible mounting 26 may be in the form of a rubber bush secured in a bracket depending from the floor of the car, or from some other sprung part.

Figure 5:
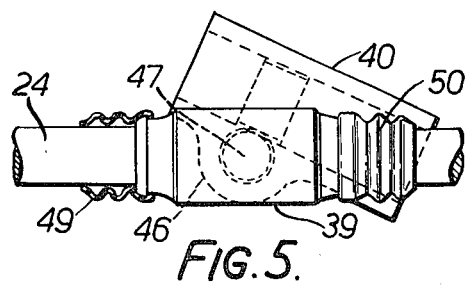
FIG. 5 is a detail plan view, to a larger scale, of the runner and its trunnion mounting which can be seen at the top of FIG. 4.

The jack-link 31 is forked or V-shaped and bosses 42, 43 at the free ends of its two arms are bored to receive a jack shaft 41, on each end of which is mounted a small cylindrical roller 44, 45, which may be of nylon. A trunnion 40, which may be of nylon loaded with molybdenum disulphide, is mounted on the jack-shaft 41 between the bosses 42, 43, and is formed on one side with a boss 46, (FIGS. 4 & 5). The boss 46 has a bore at right angles to the jack shaft 41, accommodating the stem 47 of a T-shaped runner 39, which is rotatable therein and secured by nut 48. The upper or cross part of the T-shaped runner 39 is cylindrical and has a bore accommodating a bush of low-friction abrasion resistant material such as $MoS_2$-loaded nylon, and corrugated seals 49, 50 at each end to assist in excluding grit. The runner 39 and its bush embrace the rail 24 and are slidable thereon, with sufficient clearance to permit the runner to pass along curved portions of the rail without fouling.

The jack-link 31 is pivotally mounted through bushes 62 on a steel pin 51 (FIG. 4) which is secured in a lateral cradle part 52 (FIGS. 4, 6 and 7) of the roller mounting member 22. The jack-link 31 is also pivotally connected at an intermediate point in its length to the end of the ram extension 33 by means of a pivot pin 53.

The roller mounting member 22 has two co-axial bores accommodating self-lubricating bushes 54, 55, the upper bush 54 being flanged at its top. The parking roller 10 has a forged central portion 56 comprising a spindle 57 engaging within the bushes 54, 55. The lower face of the roller mounting member 22 is separated from the upper face of the forged portion 56 by a self-lubricating thrust washer 58 and the roller 10 is secured to the mounting member 22 by means of a disc 59, bolt 60 and nut 61. The parking roller 10 comprises, in addition to the central forged portion 56, a circular dish-shaped steel pressing 62 welded to it, and an outer fluted driving ring 63 which may be an aluminium alloy die casting. An annular tread 64 of an abrasion-resistant elastomer, such as a polyurethane, is bonded to the under surface of pressing 62. This tread 64 bears the weight of the car in the operative position while driving ring 63 engages the side of the tyre.

In the operative position, jack rollers 44, 45 engage with the jacking abutment 35 which comprises a horizontal shelf 64 and vertical wall 65 (FIGS. 2, 3 and 4). Extensions 67, 68 on the ends of jack shaft 41 engage with complementary formations on abutment 35, illustrated in FIGS. 3 and 4 as a vertical end piece 69 with a horizontal U-shaped slot engaging extension 68, and a bent-out portion 691 at the other end of the abutment 35, with a horizontal U-shaped slot engaging extension 67. These formations ensure that correct location of the jack-link 31 and roller mounting member 22 relative to the jacking abutment 35 is maintained even during abnormal conditions, e.g. due to rough handling or irregularities in the road surface. In an alternative arrangement (not shown) extension 67 may be provided with a hooked collar to engage a complementary formation on the adjacent end of abutment 35.

Figure 6:
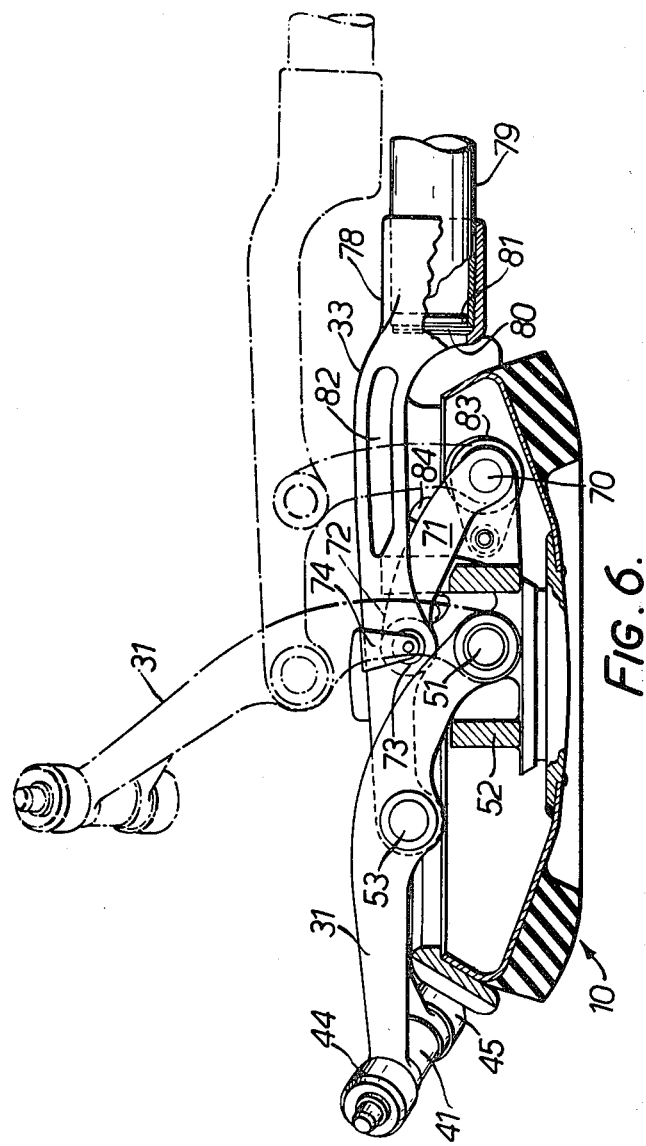
FIG. 6 is a part sectional elevation of the near side parking roller, mounting member, jack-link and secondary link, and the respective end extension of the hydraulic ram, shown in full lines in the retracted position and in chain lines in the operative position.

FIG. 6 shows the same assembly as FIG. 4 but viewed normal to the ram axis, and with the assembly shown in the retracted position. It will be seen that the upper part of jack-link 31 now lies closely along the top of roller 10 and that jack shaft 41 and jack rollers 44, 45 have taken up an oblique position, their axis being tilted downwards and inwards as it recedes from the viewer. Roller mounting member 22, which is here shown sectioned through the two arms of its cradle portion 52 in the plane of the ram axis, carries a further pivot pin 70 and pivoted about it is a link 71. Link 71 is in the form of a slightly curved strut, as it must clear the cradle portion 52 in its retracted position, as drawn. The upper end 72 of link 71 is bored for a pin 73, which is also a close fit in intermediate bores in ram extension 33. These bores are located each side of a slot milled in ram extension 33 to receive the upper end 72 of link 71. The centre distance between bores of link 71 is made slightly less than the centre distance between the lower and intermediate bores of jack-link 31, whilst the centre distance between intermediate bore containing pin 73 of ram extension 33 and the bore at its left hand end into which is fitted pin 53 to connect it with jack-link 31 is made somewhat longer than the centre distance between pin 70 engaging lower end of link 71 and pin 51 connecting jack-link 31 to roller mount 22. By this means an angular displacement of roller 10 with respect to the ram axis is achieved as the jack-link 31 is erected. It should be noted that when the equipment is in its retracted position the lines joining the upper and lower pairs of pins mentioned above are parallel, and that the angular divergence between them occurs as the assembly is erected. The ram extension 33, jack-link 31, link 71 and roller mounting member 22 thus form a quadrilateral linkage controlling the attitude of the roller 10 to the ram axis as the jack-link 31 pivots about pin 51.

The off-side parking roller and jack-link assembly are similar to the near-side roller and assembly, differing only to a minor extent in their geometry as described below.

Figure 7:
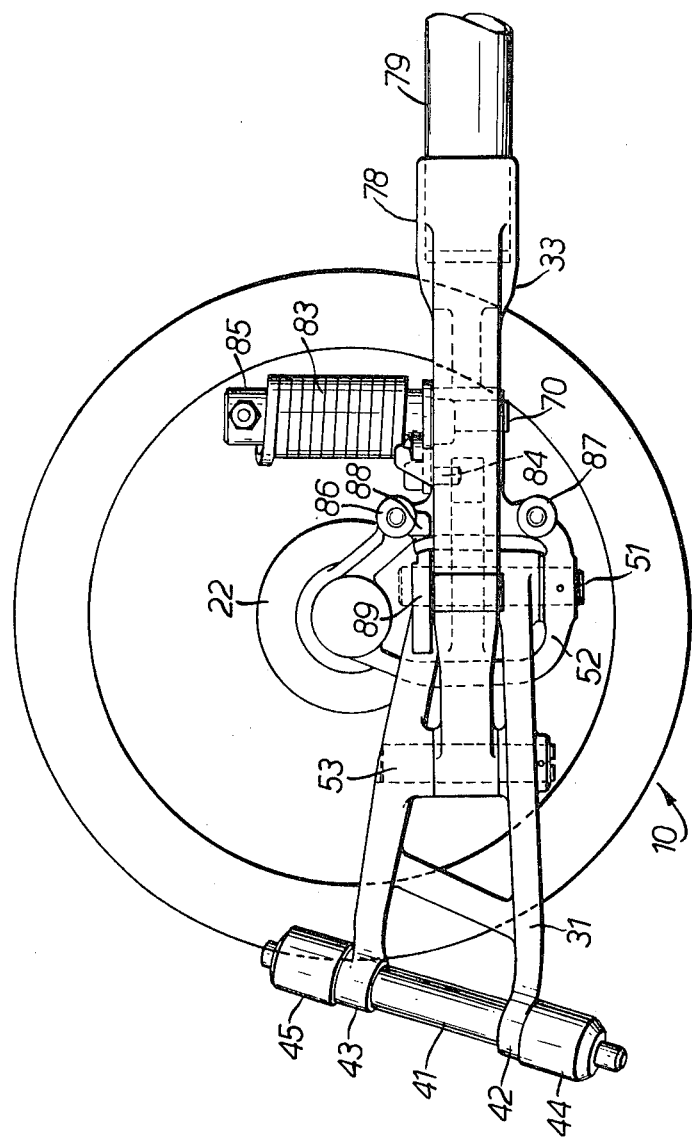
FIG. 7 is a plan view of the near-side parking roller, mounting member, jack-link and ram extension, in the retracted position.

It will be seen from FIGS. 4, 6 and 7 that jack-link 31 is formed so that jack-shaft 41 lies at an angle to pin 51 such that, in the operative position, when jack-rollers 44, 45 engage the substantially horizontal abutment 35, the axis of roller 10 is inclined substantially at the desired angle of 20° to the vertical. It should be noted that the parking rollers 10, 11 on each side will be tilted oppositely.

The problem remains of ensuring that the planes in which the rollers 10,11 are tilted converge towards the centre of the line joining the front wheel centres, as mentioned above. This may be achieved by applying the appropriate correcting angle to each roller mounting member 22, 23, but since the ram 12 already lies across the car at an angle of about $8\frac{1}{2}°$ to the rear axle 14 this would require a different angle being applied at each end. Viewed in plan, approximately 3° clockwise correction would be required to the near-side, and approximately 19° anticlockwise on the off-side. The angle of the ram 12 as viewed in plan, and the differences in the correcting angles, are due to the fact that for optimum effect, as mentioned above, the near-side parking roller 10 must be located forward of the axle, and the off-side roller 11 located to its rear. The quadrilateral linkage mentioned above is designed to apply the desired correction. It will be appreciated that if, when the unit is in its operating position and a parking roller (e.g. 10) is tilted 20° about the ram axis, it is then tilted slightly about the pivot 51 joining the roller mounting 22 to the jack-link 31, its plane of tilt, as viewed in plan, will rotate through an angle roughly three times the value of the secondary tilt applied. For example, taking the near-side assembly, if the quadrilateral linkage is adjusted so that the inboard part of the parking roller 10 is raised through an angle of about one degree, its plane of tilt, viewed in plan, will rotate clockwise through 3° as required. Similarly if the inboard part of the off-side parking roller 11 is pushed down so as to rotate the roller through an angle of some 6½° about the lower link pivot, the vertical plane in which its 20° tilt lies will rotate anti-clockwise through the required 19°. This effect may be more readily visualized, by those not familiar with the solid geometry involved, by observing that this secondary tilting movement about the roller mounting pivot (which is already lying at 20° to the horizontal) will move both the lowest and the highest points on the upper surface of the roller periphery to new positions which, when joined, will indicate the new plane containing the roller axis as viewed in plan.

In the retracted position as shown in FIGS. 6 and 7, it is desirable that the rollers 10,11 should lie horizontally, i.e. with their axes vertical, in order to occupy the minimum depth and thus permit maximum ground clearance, whereas in their operating positions each roller is required to make a different angle with the ram axis. The necessary adjustment of the quadrilateral linkage may be carried out as described above by shortening the near-side link 71 and correspondingly lengthening the centre distance between the near-side ram extension pivot 53 and the upper pivot 73 of the link 71, as compared with a normal parallelogram linkage. Similarly regarding the off-side assembly, when viewed along the axes of the four link pivots in its retracted position, whilst the lines joining the upper and lower pairs of pivots remain parallel and horizontal, the secondary link corresponding to link 71 is lengthened, and the upper centre distance correspondingly shortened, to an extent which, when the system is erected, will push the lower pivot of the secondary link downwards away from the ram axis so as to apply an angle of approximately 6½° to the parking roller 11 and its mounting 23.

The advantages to be gained from this method of achieving the required convergence are the avoidance of rather awkwardly shaped roller mountings, and more importantly, making the roller mounting an interchangeable piece as between near-side and off-side. As this is a relatively complex casting this represents a worthwhile gain in cost. The two ram extensions 33, 34 will differ from one another in any case, as described below, as one of them incorporates a means of adjustment for length, whereas the other must accommodate a means of sealing the open end of the tubular outer ram piston. Therefore no additional cost is involved in making the centre distances between the end pivots of the ram extensions and the secondary link pivots different on each side. As the secondary links themselves are small and simple components the additional cost of having two of these parts of differing length is very small.

It will be appreciated that if in their operating positions each parking roller 10, 11 is tilted at 20° in a plane not normal to the ram axis the tilt to be applied to the lower pivot (e.g. 51) joining the roller mount (e.g. 22) to the jack-link (e.g. 31) will not be quite 20°, but will be a slightly lesser angle differing on each side. Consequently the jack shafts (e.g. 41) on each side must be constrained to a position not quite horizontal. This is achieved by arranging for each jacking abutment (e.g. 35) to lie at this slightly corrected angle under average conditions of load.

FIG. 6 also shows jack-link 31 and jack rollers 44 and 45 in chain line in their erected attitude.

Figure 8:
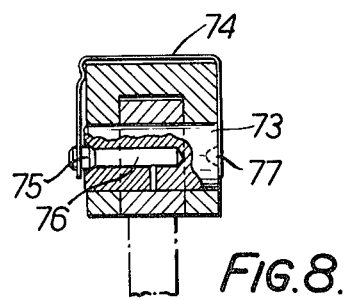
FIG. 8 is a detail cross-section to a larger scale of the connection between the ram extension and secondary link of FIG. 6.

FIG. 8 shows a section through the junction of ram extension 33 with upper end 72 of link 71. Pin 73 is shown partly sectioned in this view, and it will be seen that it is drilled axially at 76 partway through and cross-drilled to form a reservoir for lubricant, as space does not permit the fitting of self-lubricating bushes in this case. U-shaped steel spring clip 74 is fitted over ram extension 33 and acts as a retainer for pin 73, and also carries a nylon sealing plug 75 snapped into a hole in its left hand leg and entering the flared mouth of the oil hole 76 in pin 73. The corresponding right hand leg of spring clip 74 has a dimple engaging with a corresponding depression or centre-drilling 77 in pin 73. Spring clip 74 has tapering side arms to give an even distribution of stress, and its upper horizontal part is suitably embossed to add to its stiffness.

FIG. 6 shows a partial section through a circular-section boss 78 formed at right hand end of ram extension 33, which is bored and threaded to accept ram outer piston 79. Plug 80 is trapped between a shoulder at the inner end of boss 78, and the end face of outer piston 79 and it is fitted with an O-ring 81 in order to seal hydraulic fluid contained by piston 79. Ram extension 33 is of rectangular cross section through most of its length, blending smoothly into the circular section boss 78 and it may be lightened, where appropriate, by recesses 82 formed in each side and transforming it locally into an H-section.

The pin 70 securing lower end of link 71 to roller mount 22 is extended away from the viewer of FIG. 6 to form a support for torsion spring 83 (FIGS. 2, 6 and 7). One end 84 of this spring is suitably formed to engage with link 71 and apply a torque about the axis of pin 70, tending to return the assembly to its retracted position. The remote end of spring 83 is secured to spring sleeve 85 and a lug formed on the inner end of this spring sleeve is secured to roller mount 22.

FIG. 7 shows a plan view of the near-side end of the equipment in the retracted position. Roller mount 22 is shown centrally disposed in parking roller 10. Pillars 86 and 87 are formed on the right hand side of cradle 52 and have tapped holes for the terminal attachments of retraction spring cables 29 or 30 (FIG. 2). The upper pillar 86 has formed on its side nearest to ram extension 33 a stop 88, whose machined face is inclined at an angle of 1 degree to the vertical. In the case of the near-side assembly, this stop is engaged by stop pad 89, when jack-link 31 reaches its fully erect position. In this case of the off-side assembly, a packing piece, not shown, is secured to stop 88 so as to arrest jack-link 32 in the same position relative to the ram axis, although the off-side roller 11 and roller mount 23 will have been rotated through about 6½° from their retracted position when their main diameter lay parallel to the ram axis.

In some cases, to restrict rotation of the roller mounting member about the ram axis in the retracted position, it may be useful to extend the stem 47 of the runner 39, or to fit an extension over its nut 48, so as to contact the periphery of the parking roller 10 as the jack-link 31 approaches its fully retracted position.

Figure 11:
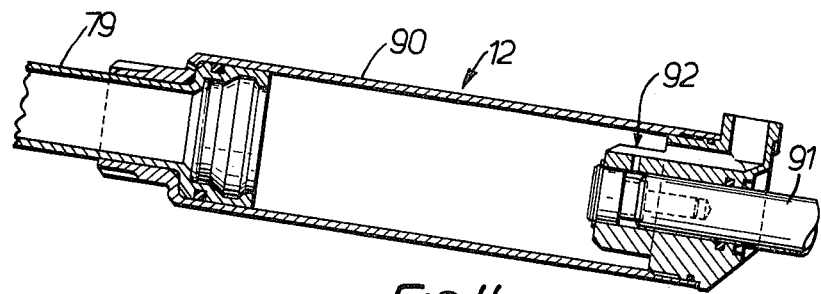
FIG. 11 is a longitudinal cross section through the hydraulic ram.

The hydraulic ram assembly 12, as shown in FIG. 11, comprises outer piston 79, secured to ram extension 33 as described above, cylinder 90 and inner piston 91 together with an interlock mechanism 92 as fully described in British Pat. No. 1,003,691 or No. 1,236,020, which ensures that the smaller diameter inner piston 91 will extend first, and will then be locked in the extended position while the larger outer piston 79 extends.

Figure 12:
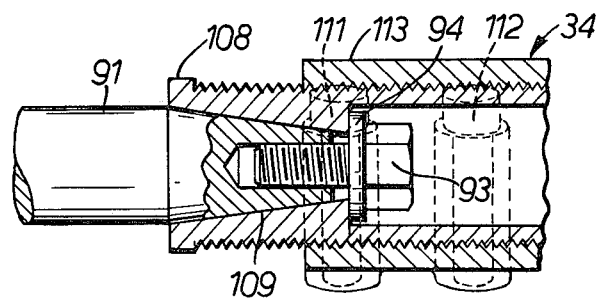
FIG. 12 is a longitudinal cross-section through an adjustment means provided on the offside ram extension.

As shown in FIG. 12, inner piston 91 is tapered at its right hand end, and tapped to accept a securing screw 93, and attached to screw adjustor 108 by means of this taper and a washer 94 and screw 93. The body of adjustor 108 is bored to a sufficient depth from the end remote from the female taper which mates with the male taper 109 of inner piston 91, so as to provide a shoulder against which the washer 94 and screw 93 abut. Flats are provided at the exposed end of adjustor 108 to permit of its being rotated by a spanner. The threads of adjustor 108 engage with female threads in a boss 113 of off-side ram extension 34 and after final adjustment these components are locked together by means of cross bolts 111 and 112. A longitudinal slot is formed in the tapped boss 113 of off-side ram extension 34 so as to permit the female threads to close on to male threads of adjustor 108.

Figure 13:
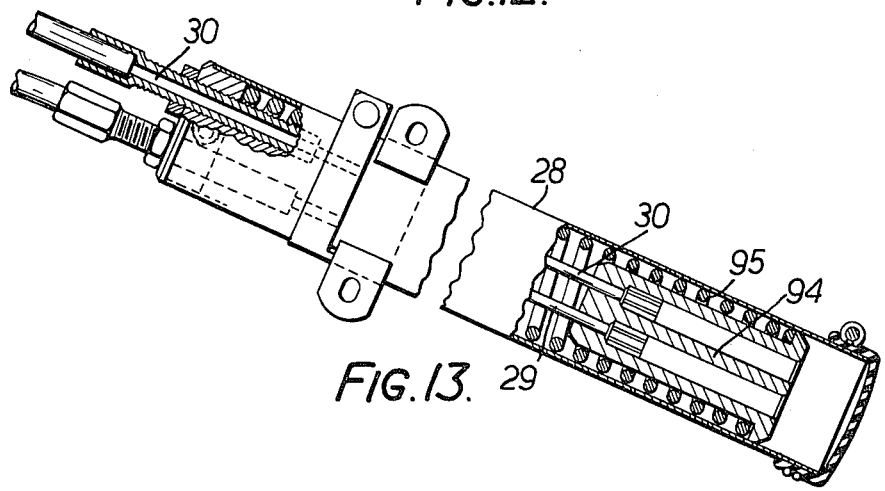
FIG. 13 is a part sectional view of the retraction spring assembly.

This ram design enables the unit to be brought rapidly from its retracted position to a point near the road, owing to the rapid extension of the smaller diameter inner piston 91, opposed only by the resistance to compression of the main retraction spring 28, which transmits its effort to both the near-side and off-side parking units by means of two Bowden cable assemblies 29 and 30. The other ends of these inner cables 29, 30 are connected to a common spring piston 94 (FIG. 13) acted on by a common coil spring 95 and by this means a synchronous movement on the near-side and off-side roller assemblies is ensured.

It will be seen that the form of runner 96 shown on the off-side assembly in FIG. 2 differs from that shown for the near-side assembly. The runner 96 is illustrated in more detail in FIGS. 9 and 9a and is designed to restrict more closely movement about axes transverse to the rail 25, for the purpose of avoiding cross-binding. It essentially comprises a block 97, e.g. of $MoS_2$-loaded nylon, which has a recess 98 for engaging one boss 421 on the end of the jack-link 32 and the jack-shaft 411 and allowing pivotal movement of the block 97 about the jack-shaft 411 (i.e. transverse to the ram axis and generally fore-and-aft of the car), and a second recess 99 formed as two intersecting bores with a spherical section 100 at the inter-section. A bearing sleeve or slider 101, which may be of an oil-loaded acetal plastics material and which is of generally similar form to the bush in runner 39, is seated in the spherical section and embraces the rail 25.

FIG. 9a shows how the recess 98 engages the boss 421 and illustrates a torsion coil spring 431 (see also FIG. 2) which is fitted around jack-shaft 411 and biasses the block 97 into the position shown. FIG. 9a also shows how the block 97 engages the off-side abutment 351 (not shown in FIG. 2) in the same manner that the roller 42 engages abutment 35 on the near side.

Another alternative form of runner which may be employed is illustrated in FIG. 10 and comprises at least one pair of grooved rollers 102, 103 mounted on relatively inclined axes and engaging opposite sides of the rail 25.

In operation, starting from the retracted position shown in chain lines in FIG. 2 in which the parking rollers lie horizontally beneath the floor of the vehicle, when the ram 12 is actuated its smaller piston 91 extends first. The roller mounting members 22, 23 are thus caused to travel down the diverging rails 24, 25. The connection of the two mounting members 22, 23 through cables 29, 30 to the common retraction spring 28 assists in maintaining synchronism of the movement, because any advance by one member ahead of the other will throw the whole retraction spring force on to the first side and remove it from the lagging side. The movement continues until the jacking rollers 44, 45 on the near-side and the block 96 and corresponding jacking roller on the off-side meet the respective jacking abutments. The smaller piston is now locked at the end of its travel by interlock mechanism 92 and the larger piston is now caused to extend, exerting a larger force and swinging the jack-links 31, 32 downwards about the jacking abutments to bring the parking rollers 10, 11 into contact with the road and with the tyres of the rear road wheels 15, 16, and lifting the latter from the road. Rotation of the wheels 15, 16 through the car's normal drive transmission will now rotate the parking rollers 10, 11 and cause the end of the car to move sideways. After operation, retraction of the assembly is effected by the retraction spring 28.

The alternative form of parking device illustrated in FIGS. 14 to 17 differs from that described above principally in that the roller mounting members 222 and 223 are rigidly attached to the ram extensions 233 and 234 respectively, and the jack-links 231 and 232 are not mounted on the roller mounting members but are pivotally mounted at their upper ends on the hub or axle assembly for pivotal movement about substantially horizontal axes extending generally fore-and-aft of the vehicle. The pivotal mountings 200 and 201 on the hub or axle assembly form the jacking abutments. Springs 283 (FIG. 16) urge the jack-links into a near-horizontal retracted position.

Figure 14:
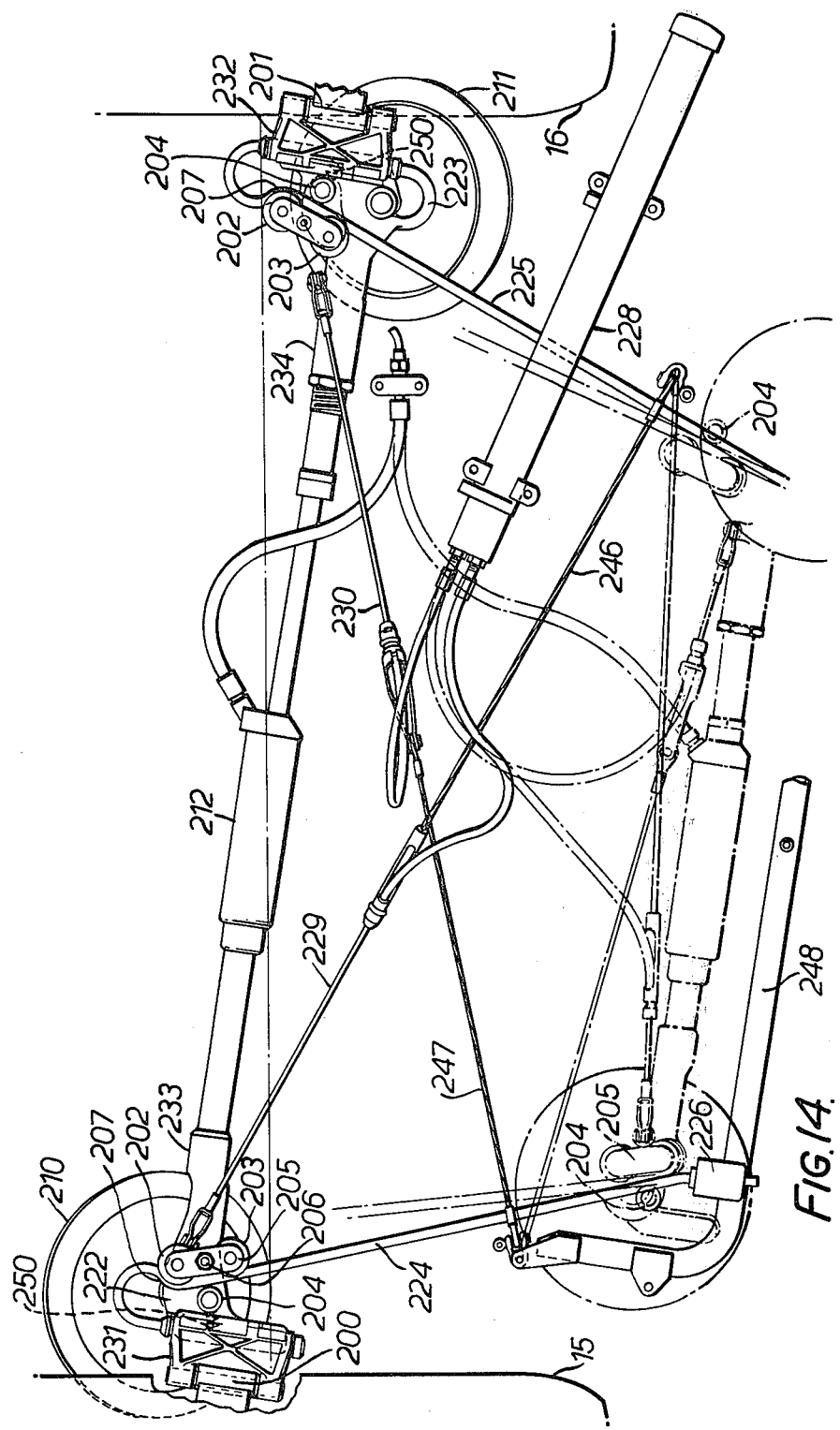
FIG. 14 is a plan view similar to FIG. 2 of a second embodiment of the present invention.

The rails 224 and 225 are attached at their upper and inner ends to the sprung part of the vehicle through flexible mountings which allow for relative sliding movement, only one of which (226) is visible in FIG. 14. The retraction spring assembly 228 and cables 229, 230, and the hydraulic ram 212, are similar to the corresponding elements of the previous embodiment.

The lower and outer ends of the rails 224 and 225, however, are first bent substantially horizontal, then given a sharp bend 207 towards the middle of the vehicle, and then bent back through more than 180° before being secured in the free ends of the respective jack-links 231, 232, in a manner allowing for rotational but not axial movement therein.

The runners in this case are each in the form of a pair of grooved rollers 202, 203 engaging one side of the rail and a plain roller 204 sprung-urged into contact with the other side. The two grooved rollers 202, 203 are mounted on common mounting plates 205 which are capable of pivotal movement about a pivot 206 secured in the roller mounting member 222 or 223. The plain roller 204 is rotatably mounted on the upper end of a pillar whose lower end has a pivotal mounting in the mounting member 222 or 223, a spring 250 (FIG. 2) acting against an intermediate point on the pillar to urge the roller 204 against the rail. This type of runner could also be used in the embodiment of FIGS. 2 to 13, in cases where sufficient space is available.

Figure 16:
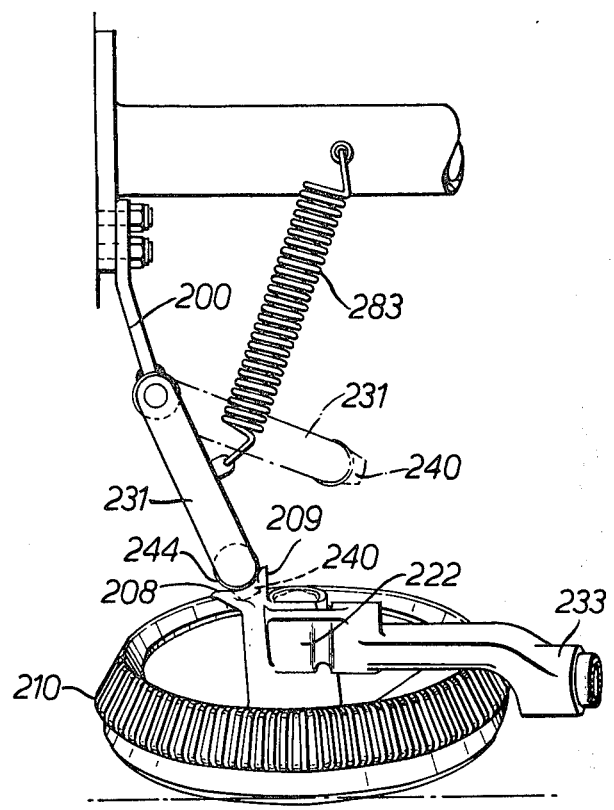
FIG. 16 is an elevational view from the rear of the near-side parking roller and jack-link in the operative position, also showing the jack-link in the retracted position in chain lines.
Figure 17:
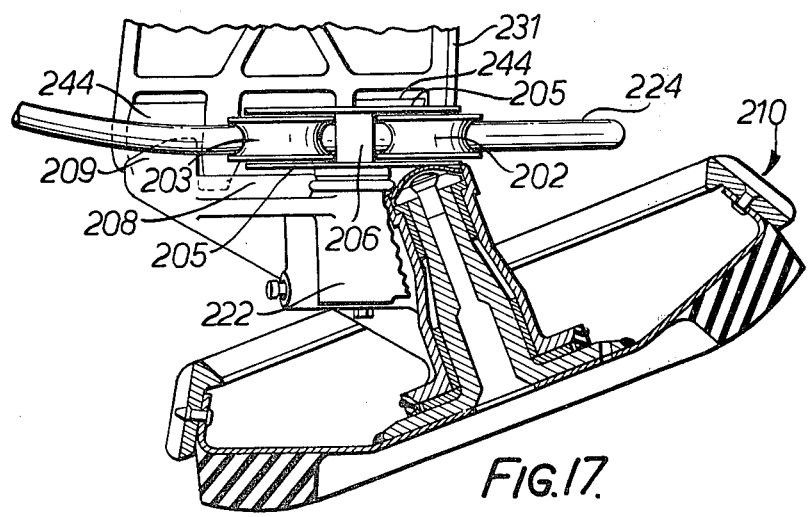
FIG. 17 is a part sectional elevation of the near-side parking roller and the end of its rail, in the operative position.

The bends 207 in the rails act as stops to limit travel of the roller mounting members 222, 223 into the operative position. When they reach these bends, a platform 208 on the roller mounting member 222, with a lip 209 (FIGS. 16 and 17), engages rollers 244 on the lower end of the respective jack-link 231 or 232 (FIG. 16). A projection 240 on the end of jack-link 231 engages in a complementary recess in the platform 208 to prevent relative sliding movement. The projection 240 may be of hook- or inverted T-shape, for example. The final extension of the hydraulic ram 212 pivots the jack-links downwards to a near-vertical position about their pivotal mounts 200, 201, thus lifting the road wheels from the road and taking the weight of the end of the vehicle on the parking rollers 210, 211 as before.

Figure 15:
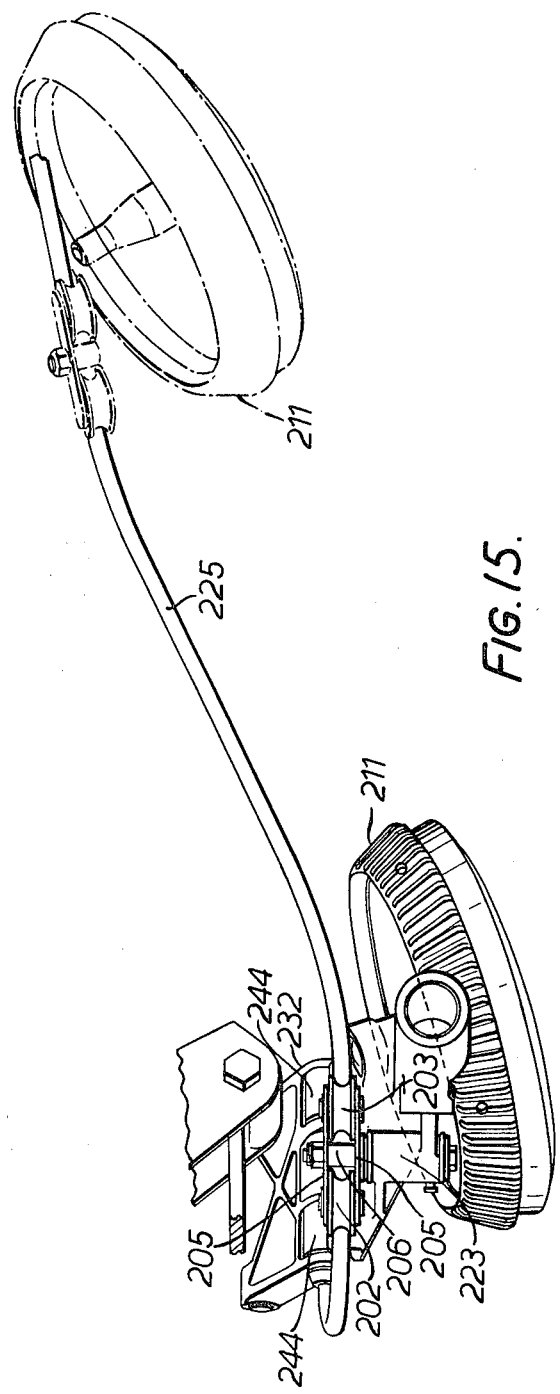
FIG. 15 is an elevational view of the off-side parking roller and its rail and jack-link, in the embodiment of FIG. 14, shown approaching the operative position in full lines and in the retracted position in chain lines.

With this arrangement, it is not so easy to arrange for the parking rollers to lie horizontally in the retracted position, but in other respects it is equally as effective as that of FIGS. 2 to 13. The parking rollers can in any case be brought nearer to a horizontal position when retracted by curving the upper part of the rails back towards the horizontal as shown in FIG. 15.

The whole assembly, including fixed anchorage cables 246, 247 forming part of the retraction spring assembly, can be attached to a sub-frame 248 (FIG. 14) mounted beneath the floor of the vehicle.

To exclude dirt, plastic covers (not shown) may be provided to receive and partly enclose the parking roller unit in the retracted position.

While the round-section steel rod rails 24, 25 of FIG. 2 and 224, 225 of FIG. 14 are relatively simple to make and convenient for engagement externally by sliding runners (such as runner 39 of FIGS. 2 to 5) or by runners comprising grooved rollers (such as rollers 202, 203, 204 of FIGS. 14 to 17), it is possible that the movement of such external runners might be impeded in service by road grit, corrosion or surface defects caused by flying stones and such like. Further, the use of high tensile steel rod for the rails places restrictions on design, particularly at the forward end of the rails, since it can only be bent around generous inside radii, making it difficult to avoid fouls with suspension components on various cars. Another disadvantage of using rails made of round rod is their poor resistance to bending. The method described above of retracting the assembly and simultaneously synchronising the movements of each side, by anchoring extensions from the spring cables (29,30 in FIG. 2 and 246, 247 in FIG. 14) at points on each side of the car substantially in line with the retracted position of the assembly, means that as the unit moves forward under the influence of the hydraulic arm (12 or 212) there is an increasing rearward component of the spring force exerted upon the roller mountings and so transmitted to the rails. This may cause the rails to bend and upset the geometry upon which their smooth working depends.

To avoid these possible drawbacks, I now propose to use rails of hollow construction, either circular or non-circular, with a slot running their full effective length and accommodating runners comprising rolling or sliding elements connected to the respective roller mounting member through the slot. The preferred form of rail appears in section like a somewhat distorted letter C, rotated clockwise through 90° so that the open side faces downwards. Such a section can conveniently be pressed from steel strip. Such hollow rails and the attitude in which they are assembled provide inherent protection against flying stones and road grit. They are also stiff in bending in the horizontal plane. As additional protection the rails may be surrounded by, or have attached to them, sealing tubes or strips made of plastic or other resilient material, whose edges normally close against one another, but can open to make way for the runner as it passes up or down the rail, and close again behind it, either by their own resilience or assisted by additional spring means.

The use of such rails is exemplified in the embodiment of FIGS. 18 to 31, which is generally similar to the embodiment of FIGS. 2 to 13 but employs inverted channel-section rails 324, 325 and a modified retraction spring arrangement. As most clearly seen in FIGS. 19 and 21, each rail 324, 325 has a flat top 401 and depending sides 402, 403 with inturned flanges 404, 405 defining between them a longitudinal slot 406, and accommodates a runner 339 with rollers 407, 408.

Figure 19:
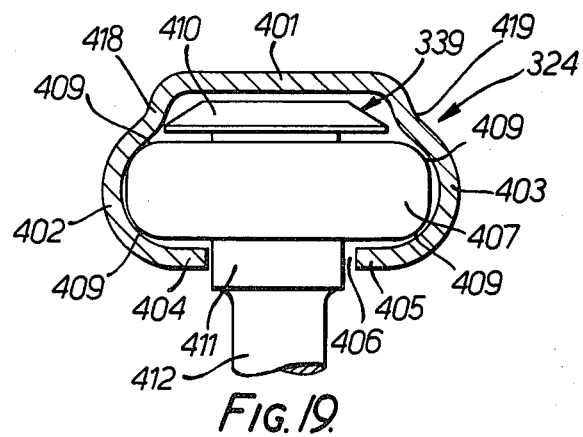
FIG. 19 is a sectional view, to a larger scale, through one of the rails of FIG. 18 showing a runner therein in elevation.

Each runner 339, as shown most clearly in FIGS. 19 and 20, comprises a pair of rollers 407, 408, e.g. of nylon loaded with molybdenum disulphide. The rollers 407, 408 are generally cylindrical but each has rounded edge portions or radii 409 joining its upper and lower faces to its periphery. The rollers 407, 408 are journalled between plates 410 and 411, the lower plate 411 being formed integrally with a stem 412 whose lower part is screw-threaded at 413. The stem 412 is rotatably received in a bore 414 in a trunnion 340 (FIGS. 22 and 23) and secured by nut 415 (FIG. 22). The trunnion 340 here shown is the one on the off-side (right-hand) parking assembly, in which the bore 414 is inclined so as to lie at right angles to the inclined rail 325 (FIG. 22). On the left-hand assembly the bore 414 is vertical because the end of rail 324 is horizontal (FIG. 25). The trunnion 340 fits over the jack-shaft 341 in a similar manner to the trunnion 40 of FIGS. 3 to 5, but it is provided with a recess 416 (FIG. 22) to embrace the boss 343 on the end of the adjacent arm of the jack-link 331 and thus extends on both sides of boss 343. It also provides a part-cylindrical surface 417 for engaging the respective jacking abutment 335, 336, thus replacing the roller 45 of FIGS. 3 to 7.

Figure 21:
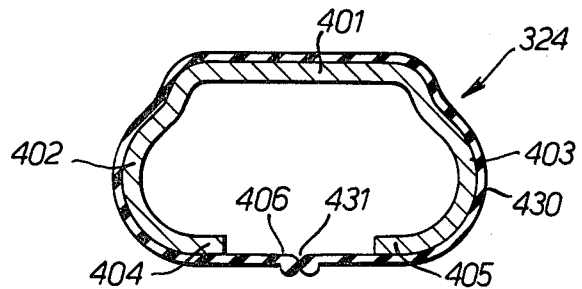
FIG. 21 is a section through the rail of FIGS. 18 to 20 showing provision of a flexible sealing means.

The preferred section for the hollow rails 324, 325 is shown in FIGS. 19 and 21, in which it can be seen that the sides 402, 403 of each rail are curved and the curve is carried round sufficiently far to engage both the upper and lower rounded edge portions 409 of the rollers 407, 408, with a small lateral clearance. The flat top 401 is raised, through the re-entrant curves 418, 419, to clear the top plate 410 of the runner 339. The runner 339 is thus free to travel along the rail 324, 325 but is restrained from rotation about axes parallel or perpendicular to the rail.

As shown in FIG. 21, a flexible seal in the form of a plastics tube 430 may be provided, embracing the rail, with a longitudinal slit 431 extending down the length of the slot 406 to allow passage of the runner 339.

For the arrangement described above to work satisfactorily, the rollers 407, 408, must remain substantially square to the major axis of the rail 324 or 325 as viewed along the axis of the ram 312. The ram remains substantially horizontal during operation, so this can be achieved by maintaining the runner stems or pivots 412 substantially vertical, as viewed from the rear of the car. They will of course be tilted in a fore and aft plane to follow the slope or curvature of the rail at any particular point. The construction of the trunnion 340 with the recess 416 embracing one boss 343 of the jack-link 331 ensures that, when rotated around the jack shaft 341 in a sense that brings the upper surface of the trunnion 340 towards the centre of the car, it is arrested by the upper surface of the recess 416 coming into contact with the surface of the jack link arm, when the runner pivot bore 414 is vertical, assuming the jack-link 331 to be in its retracted attitude. As the jack shaft 341 must necessarily rotate through about 57° to assume its operational position and at the same time the trunnion 340 and runner 339 must maintain their substantially vertical attitude, the trunnion recess 416 is of suitable proportions to permit this movement and the trunnion 340 is urged towards its original position by a torsion spring 420 (FIGS. 18, 22 and 23) surrounding the exposed central part of the jack shaft 341. One end 421 (FIGS. 22 and 23) of this spring 420 engages a lower extension 422 on the trunnion 340 parallel to the jack shaft 341, and the other end 423 (FIG. 18) is formed so that after a preload has been applied, it can be secured under a crossbar 424 joining the arms of the jack-link 331. Whereas the abutment surface in the upper part of the trunnion recess 416 coming in contact with the jack-link arm resists inward rotation of the runner 339 during extension of the equipment to its operational position, during retraction the inward periphery of the rollers 407, 408 will engage the rail 324 or 325 and the tendency will be for the runner 339 to be pushed outwards away from the centre of the car. The torsion spring 420 referred to above must exert sufficient strength in its assembled condition to resist such a tendency, as well as supporting the weight of the parking unit, which will be tending to rotate the trunnion 340 outwards owing to the necessary offset between the jack shaft 341 and the runner pivot or stem 412.

To arrest the runners 339 at the end of the retraction movement, a small rubber bush 337 (FIG. 25) may be fixed in each rail 324, 325.

The rails 324, 325 are attached to the jacking abutments at their forward ends and to the car body or frame at their upper and rearward ends in any convenient manner which allows for the relative movement of the rear suspension and the car body. As shown in FIGS. 18, 22, 25 and 26, the rails 324, 325 are pivotally attached at their forward ends to jacking abutments 335, 336, similar to the abutment 35 shown in FIGS. 2, 3 and 4, by means of horizontal pivot bolts 447, 448 secured to the respective abutments 335, 336, and working in rubber bushes 449, 450 in sleeves secured to the ends of the rails. The rear ends of the rails 324, 325 are attached to the sprung part of the car to allow for pivotal and longitudinal movement of the rails relative to the car body as the car's road wheel suspension flexes. For example, the rear ends of the rails might simply be attached by rubber-bushed clamps permitting sliding movement to the underside of the car body or frame.

Figure 18:
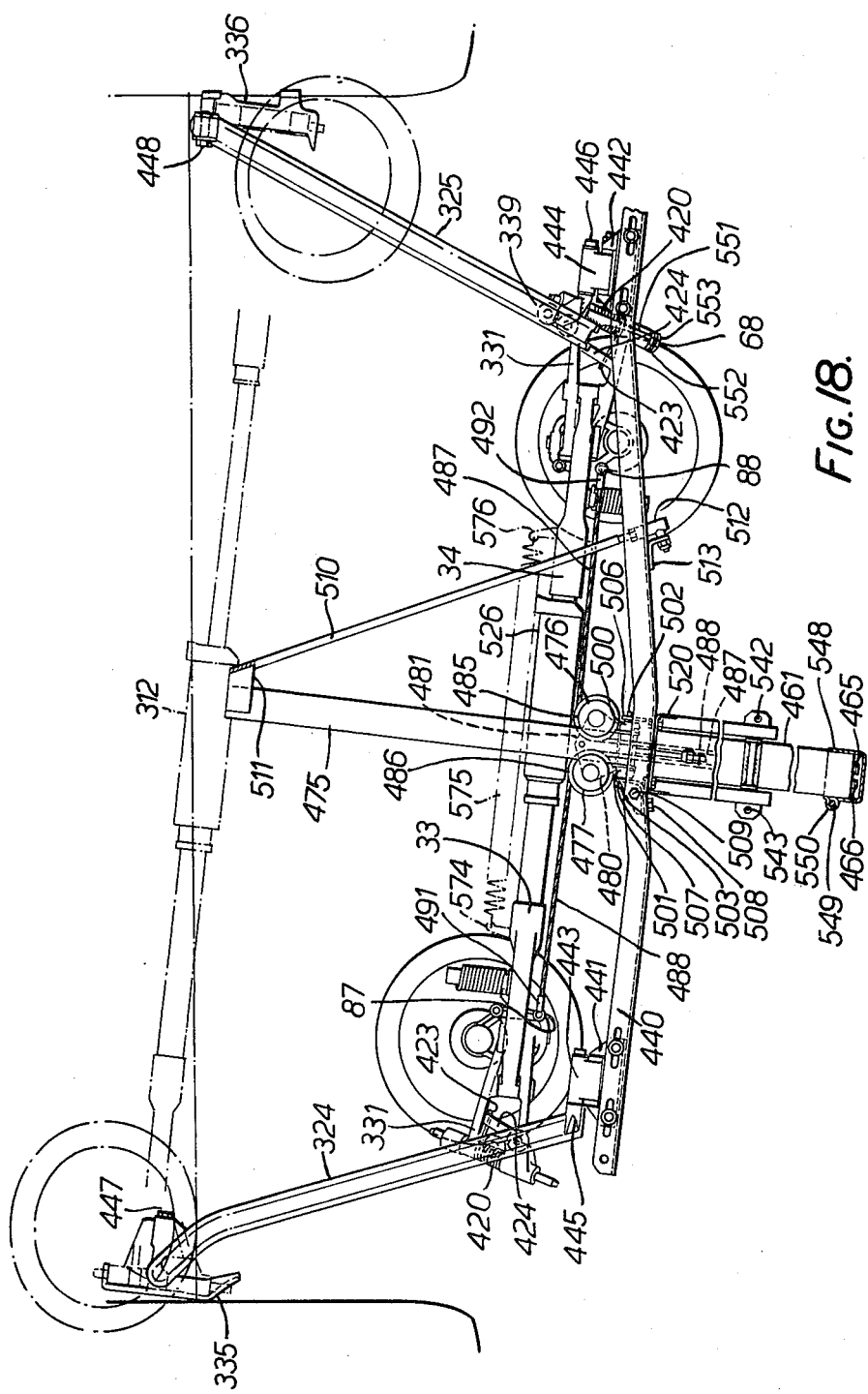
FIG. 18 is a plan view similar to FIGS. 2 and 14, of a third embodiment of the invention.

The preferred rear mounting shown in FIGS. 18, 24 and 25 is in the form of inverted shackles, as used in leaf spring car suspensions, to provide forward and downward movement of the rails as the car body rises on rebound.

A bracket 440 is bolted to the underside of the car floor behind the rear axle and carries laterally adjustable shackle brackets 441 and 442 upon which are mounted inverted shackles 443 and 444 respectively, the line joining whose upper and lower pivots lies at about 15° to the vertical when the car is at rest and normally loaded (see FIGS. 24 and 25).

Secured in the upper ends of shackles 443 and 444 are pivot pins 445 and 446 attached to the rails 324, 325.

In the illustrated embodiment it is convenient to make the right-hand or off-side rail 325 straight in both planes whereas the left-hand rail 324 is curved in the vertical plane at its upper or rearward end and compoundly curved towards the forward end as shown in FIGS. 25 and 26, these curvatures being applied to facilitate clearing car suspension components since the near-side or left-hand side assembly is located in front of the rear axle axis.

A hydraulic operating ram 312 is provided as in the preceding embodiments and the remaining parts of the parking device of FIGS. 18 to 31, apart from the retraction spring assembly, are the same as the corresponding parts of that described with reference to FIGS. 2 to 8 and 11 to 13. It is believed that no further description will therefore be necessary, apart from that which follows concerning the retraction arrangements.

Figure 27:
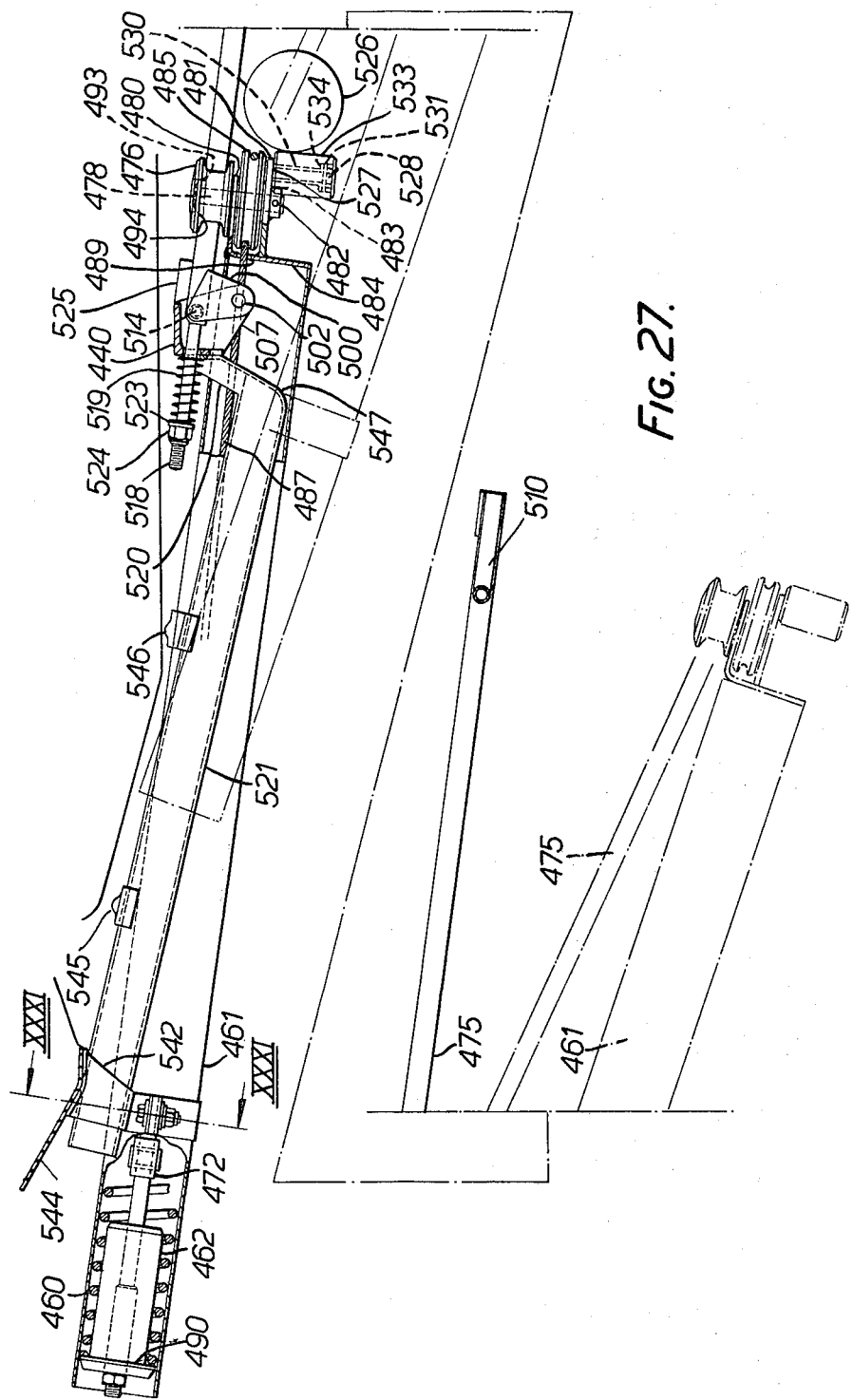
FIG. 27 is an elevational view, partly in section, of a retraction spring assembly with associated synchronising guide bar.

When the parking or similar manoeuvre has been completed and the parking control has been moved to the off position, pressure will decay in the ram 312 and the task of returning the equipment to its retracted position is carried out by a spring 460 (FIG. 27) contained in tube 461. A piston 462 at the rear of the helical retraction spring 460 is adjustably connected to cables 487 and 488, as shown in FIGS. 27 and 28. Piston 462 is bored and counterbored to accept adjusting screws 465 and 466 which are secured by elongated nuts 467 and 468, which are tapped only at their right hand end as at 469, the remainder of their length having clearance holes for screws 465 and 466. Hexagons as shown at 470 are formed at their rear ends (left hand end of FIGS. 27 and 28) to facilitate adjustment of cables 487 and 488, which are swaged into the right hand ends of screws 465 and 466 as at 471.

To prevent undesirable rotation of screws 465 and 466 whilst being adjusted, an anti-rotation block 472 is engaged with screws 465 and 466 which pass through two clearance holes in it and have inward facing flats 473 formed on them, which flats are engaged by tension pin 474 pressed into a hole in block 472 which breaks into the clearance holes containing screws 465 and 466.

Figure 30:
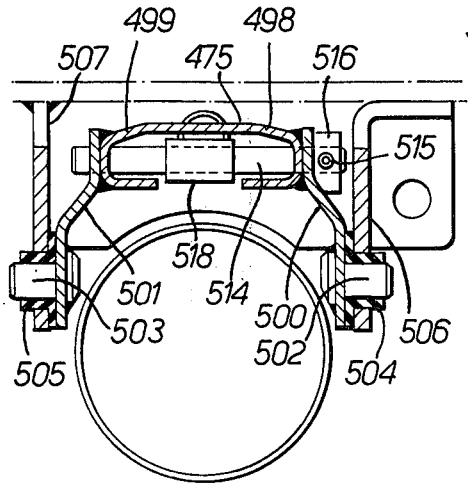
FIG. 30 is a cross-section on line XXX—XXX of FIG. 29.
Figure 31:
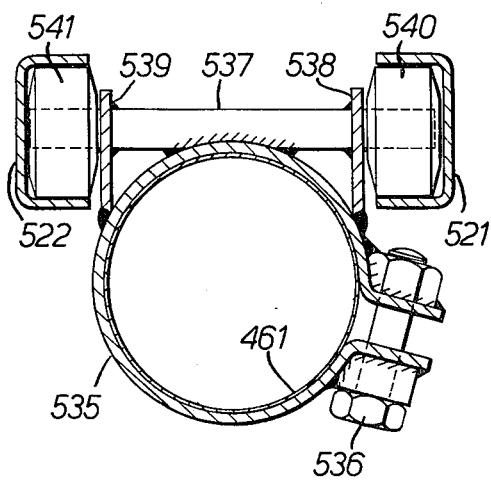
FIG. 31 is a cross-section on line XXXI—XXXI of FIG. 27.

FIG. 18 and FIG. 29 show plan views of the retraction assembly and FIG. 27 shows a side elevation of the assembly in its retracted attitude, and a view in chain-line of the equipment in its operating position. FIG. 28 shows a sectional plan view of the cable adjustment arrangement described above. FIG. 30 shows a part sectional view through the arrangement for pivoting the synchronising bar 475 and FIG. 31 shows a part sectional view through the arrangement for supporting the rear part of spring tube 461.

In the arrangements for retracting the parking equipment shown in FIGS. 2 to 13 and FIGS. 14 to 17, an angle develops between the retraction cables and the axis of the hydraulic ram, as the equipment moves downward towards its operating position. Such an angle reduces the efficiency of the inclined rails as a means of urging the parking assembly forward as the ram extends, and it is an object of the retraction arrangement now described to eliminate the development of this angle between the retraction spring cables and the ram axis, or to arrange that such an angle only develops in the final stage of extending the equipment into its operating position, at which stage it can have no undesirable effect.

This object is achieved by suspending the forward part of spring tube 461 from a synchronising bar 475 by means of grooved rollers 476 and 477. These rollers are pivoted on headed pins 478 and 479 which pass through plates 480 and 481 and are secured by tension pins as 482 passing through them and through collars as 483 welded to the underside of plate 481. Plate 480 is bent so that its rearward part 484 closes off the front face of spring tube 461 and is welded thereto, this part 484 thus forming an angle of about 92° to the remaining part of plate 480 and to plate 481. Grooved pulleys 485 and 486 are located between plates 480 and 481 and pivot about pins 478 and 479. Retraction spring cables 487 and 488 pass around grooved pulleys 485 and 486, through holes as 489 in plate 480 and thence along spring tube 461 inside retraction spring 460 whose forward end abuts against part 484 of plate 480 where it is welded to front face of tube 461 and whose rearward end abuts against the shoulder 490 of spring piston 462.

After turning through about 90° in the grooves of pulleys 485 and 486, cables 487 and 488 extend transversely outwards to be secured to cable anchorages 87 and 88 by means of swaged eyes 491 and 492 and suitable screws and bushes. Grooved pulleys 485 and 486 and grooved rollers 476 and 477 may be made from a molybdenum disulphide-loaded nylon and suitable recesses may be formed above the counterbore as 493 containing the heads as 494 of pins 478 and 479. Into these recesses may be snapped plastic caps 495 and 496 to seal pins 478 and 479 against the ingress of dust and water. Synchronising bar 475 is formed of sheet metal into a channel shape as shown in the end view in FIG. 30. The upper angled surfaces of rollers 476 and 477 engage with correspondingly angled surfaces 498 and 499 of synchronising bar 475, thus transferring the weight of the spring and tube assembly on to synchronising bar 475, which is itself supported at the rear by side plates 500 and 501 to which are secured by welding, or similarly, headed pins 502 and 503, which rotate in bushes 504 and 505, pressed into side plates 506 and 507, one of which may be welded to mounting bracket 440 whilst the other is formed into an angle bracket and secured to bracket 440 by screws and nuts 508 and 509 to facilitate assembly.

At its forward end synchronising bar 475 is secured to stay 510 by means of plate 511. The stay 510 extends diagonally back to bracket 440 to which it is secured through the intermediacy of adjustable ball joint 512 and bracket 513. The centre of ball joint 512 should lie as nearly as possible on the prolongation of the axes of pins 502 and 503. The purpose of stay 510 is to maintain the attitude of synchronising bar 475 as the equipment extends, and to prevent excessive loads falling upon pivots 502 and 503. As the equipment moves towards its operating position the whole assembly comprising spring tube, spring, and the nylon rollers and pulleys, will be drawn forward together with the ram and parking wheel assembly by the tension in cables 487 and 488, which will be pulled outwards as the equipment moves forward and downward thus compressing retraction spring 460. It is desirable that synchronising bar 475 should permit the spring and cable assembly to descend with the ram assembly and maintain approximately its original relationship thereto as viewed in elevation. At the same time the synchronising bar 475 must remain in its uppermost position when the parking device is not in use so as not to reduce the ground clearance of the vehicle. To achieve these objects a pivot pin 514 passes through holes in the rear of synchronising bar 475 and its associated mounting plates 500 and 501. It is secured by a tension pin 515 passing through a block 516 welded to side plate 500. Pin 514 passes through a hole 517 in T-headed bolt 518 which in turn passes through a clearance hole in bracket 440. A spring 519 surrounds bolt 518, its forward end resting in a suitable abutment formed on bracket 520 supporting the forward end of spring tube support rails 521 and 522. At the rear of spring 519 it engages with shouldered washer 523, which is supported by stiffnut 524. It will be seen that spring tube 461 slopes upwards towards the rear to conform to the typical shape of a car underbody, so bolt 518 and spring 519 must slope upwards to the rear in order to clear the spring assembly. Spring 519 is compressed to sufficient degree to lift synchronising bar 475, pivoting about pins 502 and 503, to its static position wherein it provides sufficient ground clearance.

Further upward movement of synchronising bar 475 is prevented by stopblock 525, which is secured to the top of bar 475 either rigidly or adjustably and comes into contact with the forward edge of bracket 440 at the upward limit of travel of synchronising bar 475. The tension in the spring 519 must be sufficient to maintain the static attitude of synchronising bar 475 against normal vertical accelerations induced by road irregularities. As the equipment moves forward towards its operating position, however, the weight of the spring assembly borne by synchronising bar 475 will act with increasing leverage about pivot pins 502 and 503. This force, together with tension in cables 487 and 488, will progressively overcome the resistance of spring 519 causing synchronising bar 475 and spring tube 461 to descend eventually to the positions shown in chain-line in FIG. 27.

To prevent the spring assembly moving forward when the car's brakes are applied, for example, and striking the cylinder 526 (FIG. 27) of ram 312 which lies immediately in front of it, plate 485 has its profile extended forward in its central portion and is drilled at 527 to carry a bolt 528 which is passed upwards from its underside, first through a washer 531 then through tube 530 and plate 481 above which it passes through button 529 and is secured by stiffnut 532.

Mounted on tube 530 and supported by washer 531 is a rubber roller 533 fitted with a flanged bush 534, which may be of $MoS_2$-loaded nylon. Tube 530 is nipped against plate 481 by the tension of bolt 528 and the lengths of rubber roller 533 and bush 534 must be such as to provide some vertical end float, allowing for expansion of the nylon bush under conditions of humidity. As the equipment extends, ram cylinder 526 will move transversely relative to the retraction spring assembly, so rubber roller 533 will roll along it whilst maintaining the same relationship in elevation between the respective parts.

The button 529, which is also secured by bolt 528, has an external profile which enters slightly into the grooves of pulleys 485 and 486 but has a small clearance from the edges on the pulley groove and from the outer periphery of cables 487 and 488 as they pass around pulleys 485 and 486. The purpose of this button is to prevent the displacement of either cable out of its groove should it become slack during any part of the cycle.

Spring tube 461 extends rearwards and slightly upwards past bracket 440 and is supported by a circular clip 535, which is clamped about tube 461 by screw 536.

Side plates 538 and 539 and horizontal pivot pin 537 are welded to clip 535, and rollers 540 and 541 are mounted on the outboard ends of pin 537. They engage with suitable clearance in channels 521 and 522. The ends of pin 537 being so arranged that they cannot protrude through rollers 540 and 541, which may be of $MoS_2$-loaded nylon, as it is undesirable that pin 537 should come into physical contact with channels 521 or 522. Channels 521 and 522 have welded to their rearward end brackets 542 and 543, these brackets being bolted to a convenient portion of the rear of car body 544. Channels 521 and 522 are further stiffened by bridge pieces 545 and 546 which have embossed upper surfaces to add to their rigidity. At their forward ends channels 521 and 522 have radii 547 which act as the forward limit of the movement of rollers 540 and 541 and the lower surface of the channels then sweeps upward to form the forward face of bracket 520 whereby channels 521 and 522 are attached to mounting bracket 440. When the parking, or similar manoeuvre, has been completed and the control valve is moved to the "off" position, the pressure in the hydraulic system will decay and the force of fully compressed spring 460 exerted through cables 487 and 488 will pull the extended hydraulic ram 312 towards its closed position.

In closing, the ram and its associated parking roller and linkage assemblies will travel back along rails 324 and 325 and rubber roller 533 will push the retraction spring assembly back with it until they return to their original position and synchronising bar 475 is lifted into its static position by spring 519.

The rearward end of spring tube 461 is closed by plastic cover 548 secured by screw 549 in slotted and tapped boss 550. It will be seen that when the device is in its retracted position its weight, referring now to the right hand or off-side assembly, is taken by rollers 407 and 408 attached by runner 412 to trunnion 340, or by runners of the alternative design described below with reference to FIGS. 32 to 34. This supporting assembly is normally offset from the centre of gravity of the unit, particularly on the offside and a danger exists that when the vehicle is travelling over severe road irregularities the vertical accelerations imposed thereby may cause undesirable stresses in the material surrounding bore 414 of trunnion 340. To obviate this danger a sheet metal extension 551 is welded to the rear of rail 325 and extends under mounting bracket 440 to the rear of the position occupied in retraction by jack-roller 43. It is there formed into a ring 552 into which is fitted a grooved polyurethane bush 553. As the rear end 68 of jack-shaft 41 approaches its final position on retraction it will engage with bush 533, thus providing an additional support for the unit, located on the side of its centre of gravity remote from rollers 407 and 408. The degree of imbalance on the nearside is very much less pronounced and although this could be corrected by a comparable arrangement it is not thought necessary to do so.

Figure 32:
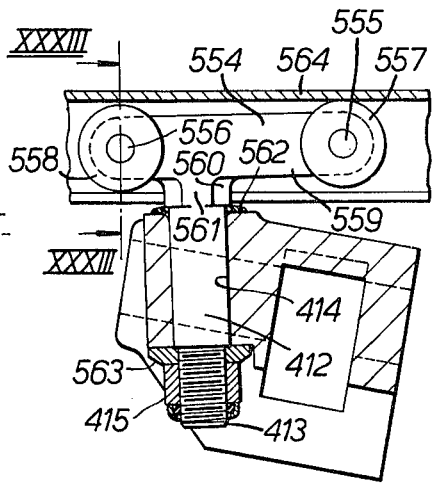
FIG. 32 is a vertical section through a modified runner assembly, seen in a similar position to that of FIG. 22.
Figure 33:
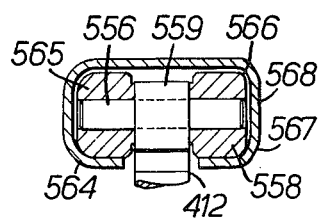
FIG. 33 is a cross-section on line XXXIII—XXXIII of FIG. 32.
Figure 34:
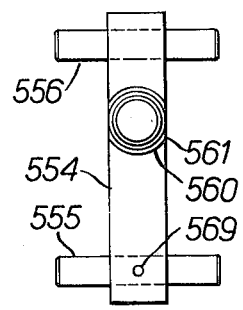
FIG. 34 is a plan view from below of the runner of FIGS. 32 and 33, but with the rollers removed.

An alternative design of runner and roller to that disclosed in FIGS. 19, 20, 22 and 23 is shown in FIGS. 32 to 34. This arrangement employs the same trunnions as earlier described, for example the offside trunnion 340 shown in FIG. 22 appears also in FIG. 32. The runner 554, however, is of different design having substantially horizontal bores for pivot pins 555 and 556, whereupon are mounted four generally cylindrical rollers as 557 and 558. Runner 554 is of generally T-shaped construction, its upper part 559 being of rectangular cross-section and joined to the journal part 412 by a short length of increased diameter 560. This larger diameter is cut away by flats as 561 resulting from the narrower section of rectangular portion 559. Advantage is taken of the shoulder between diameter 560 and journal 412 to fit elastic dust seal 562 whose outer lip bears on the top face of trunnion 340. At the lower end of trunnion 412 are fitted thick chamfered washer 563 and stiffnut 415, in such a way as to leave runner 554 free to rotate in bore 414 of trunnion 340.

It will be noticed that rail 564 is shown canted at a slight angle to the line joining the centres of pins 555 and 556 so that the clearance existing between rollers 557 and 554 appears above the roller in one case and below in the other. This is shown to illustrate the effect of the out-of-balance suspension of the unit causing one roller to run along the lower surface of rail 564 and the other at times to run along the top surface. The distance between the axis of journal 412 and the axis of either pin is not necessarily equal. Space considerations on the installation may restrict this distance as applied to the leading roller and it may be advantageous to extend the other roller centre distance rearward to reduce the bearing loads resulting from the imbalance mentioned above.

FIG. 33 shows a section XXXIII—XXXIII through the axis of the left hand roller pivot pin 556 in FIG. 32. Pin 556 passes through a reamed hole in rectangular portion 559 of runner 554 and may be retained simply by being a press fit therein or it may be further secured by a tension cross pin as indicated in FIG. 34. Its length is such that its ends cannot protrude through either of rollers 558 or 565, when these rollers are in their innermost position bearing against the side faces of runner 554. Rollers 558 and 565 may be of MoS$_2$-loaded nylon and are chamfered on their inner corners so as to leave a circular thrust face bearing as the sides of runner 554.

Two different methods of arranging for these rollers to accept the side thrusts either of ram extension or retraction spring force, are illustrated on either side of FIG. 33. On the left hand side roller 565 is shown with radiused corners, whereas rail 564 has corresponding internal radii which are rather larger.

The vertical axis on which these radii on the respective parts are struck may either coincide or the internal radius of rail 564 may be a little further out from the centre than that of roller 565. As there is an appreciable clearance at the outer sides of the two rollers and above them as viewed in this Figure, it will be seen that any combination of vertical and sideways force will induce the rollers to run along the upper or lower track of runner 564 without frictional contact resulting between the opposite surfaces of those rollers which will, of course, be moving in the opposite direction relative to rail 564.

On the right hand side of FIG. 33 an alternative arrangement shows smaller radii, as 566, formed on the outer corners of roller 558 (and 557). Corresponding radii are formed on the internal corners of rail 564. These may have the same radius as those on the runner, but they do not extend through 90°. At an intermediate angle they extend outwards for a short distance in a straight line as at 567. These inclined elements of the rail may then be joined by a straight portion 568 or they may continue to be joined by a radius not shown.

FIG. 34 is a view from beneath runner 554 showing the pressed-in pins 556 and 555 but with the rollers removed. Pin 555 is shown optionally secured by tension pin 569, the flats 561 imposed on the larger diameter portion 560 are shown end on in this view.

In some cases it may be advantageous to fit an auxiliary spring acting between the two ram extension castings 33 and 34 on the side of the ram remote from the main retraction spring cables. Such an arrangement is shown in chain-line on FIG. 18, where pillars 574 and 576 project from ram extensions 33 and 34, and have eyes through which pass rings or hooks at the respective ends of extension spring 575. The auxiliary spring would normally exert a substantially smaller force than the main retraction spring, and so would not interfere with synchronisation.

In a modification, the synchronising bar 475 may be mounted on the bracket 440 so as to be pivotable, at least to a limited extent, in the horizontal plane as well as the vertical plane, and the stay 510 may be made resiliently extendable, e.g. by incorporating a preloaded spring in its mounting 512 on the bracket 440. In this case, when the roller assemblies reach the final stage of their movement into the operative position where the near-side assembly moves sharply onwards then the off-side assembly due to the curve in the end of the near-side rail 324, the synchronising bar 475 can pivot towards the near-side of the vehicle to equalise tension in the retraction spring cables.

We claim:

1. A parking device for a motor vehicle, comprising a pair of parking rollers rotatably mounted in respective roller mounting members which are connected to respective ends of an extensible power means and which are arranged to be transported along respective rails on extension or retraction of the power means, each rail being adapted to extend from a mounting on the sprung part of the vehicle under the floor of the vehicle downwardly and outwardly to a location adjacent to a respective one of a pair of road wheels of the vehicle, so that extension of the power means will cause the assembly of parking rollers, roller mounting members and power means to move bodily from a retracted position clear of the road and adjacent to the upper ends of the rails to an operative position adjacent to the said pair of road wheels, in which operative position the parking rollers will take the weight of the adjacent end of the vehicle and enable it to be moved sideways.

2. A parking device according to claim 1, wherein the parking rollers take the weight of the end of the vehicle through jacking abutments on the unsprung part of the vehicle co-acting with the roller mounting members.

3. A parking device according to claim 1, wherein each rail is adapted to be connected, at its lower and outer end, to a road wheel hub assembly or axle assembly of the vehicle through a pivotal connection allowing for road wheel suspension movements.

4. A parking device according to claim 1, arranged so that the parking rollers, in the operative position, lie one ahead of and one behind the centre line of the said pair of road wheels, with the roller axes inclined at equal but opposite angles to the vertical.

5. A parking device according to claim 4, wherein the roller axes each make an angle of substantially 20° with the vertical, in the operative position.

6. A parking device according to claim 1, wherein each roller mounting member carries means which engage the respective rail so as to exert a degree of control over the attitude of the parking roller with respect to the rail.

7. A parking device according to claim 6, wherein the means which engage the rail are arranged to allow at least a limited movement of the roller mounting member about an axis transverse to the rail and to the axis of the extensible power means, while restraining movement about the axis of the extensible power means.

8. A parking device according to claim 7, wherein the means which engage the rail comprise a slidable sleeve or runner embracing the rail and mounted through a trunnion on the roller mounting member.

9. A parking device according to claim 7, wherein the means which engage the rail comprise a block engaging the rail by means of a slidable sleeve having a spherical mounting in the block, the block being mounted on the roller mounting member for pivotal movement about an axis extending transverse to the axis of the power means and generally fore-and-aft of the vehicle.

10. A parking device according to claim 7, wherein the means which engage the rail comprise at least one pair of grooved rollers mounted so as to engage opposite sides of the rail.

11. A parking device according to claim 7, wherein the means which engage the rail comprise a pair of grooved rollers arranged side-by-side and engaging one side of the rail and a cylindrical roller spring-urged against the other side of the rail, the two grooved rollers being mounted on the roller mounting member through a common pivot disposed between them.

12. A parking device according to claim 2, wherein one of the jacking abutments is provided adjacent to each of said pair of road wheels, on a road wheel hub assembly or axle assembly of the vehicle, and is disposed so that the respective roller mounting member co-acts with the jacking abutment as it approaches the operative position.

13. A parking device according to claim 12, wherein each roller mounting member co-acts with the respective jacking abutment through a pivotally mounted jack-link which is normally held in a near-horizontal position by a spring but which can be pivoted to a more nearly vertical position by the final extension of the power means, for taking the weight of the end of the vehicle on the parking rollers.

14. A parking device according to claim 13, wherein each jack-link is pivotally mounted at one end on the roller mounting member and is adapted at its other end to engage the respective jacking abutment, and each of the roller mounting members is connected to the extensible power means by way of a pivotal connection between an intermediate point on each jack-link and a respective end portion of the extensible power means, so that when the end of each jack-link has engaged the respective abutment, the final extension of the power means causes the jack-links to pivot downwards from the respective abutments into the more nearly vertical position, and thereby causes the roller mounting members to be swung downwards into the operative position.

15. A parking device according to claim 14, wherein the said other end of the jack-link and the respective jacking abutment are provided with complementary formations adapted to co-operate as the roller mounting member approaches the operative position.

16. A parking device according to claim 15, wherein the complementary formations include rollers on the said other end of the jack-link, and a horizontally extending shelf with a vertically depending wall forming the jacking abutment.

17. A parking device according to claim 15, wherein the complementary formations include mating formations adapted to resist relative sliding movement between the jack-link and the jacking abutment in the operative position.

18. A parking device according to claim 14, wherein each roller mounting member also carries a second pivotal link, pivoted at one end to the roller mounting member and at its other end to an intermediate point on the end portion of the extensible power means, and forming with the said end portion, the jack-link, and the roller mounting member a quadrilateral linkage which controls the attitude of the parking roller in relation to the axis of the extensible power means.

19. A parking device according to claim 18, wherein the quadrilateral linkages are arranged so that, in the retracted position, the rollers lie substantially horizontal with their axes substantially perpendicular to the axis of the power means, whereas in the operative position the axes of the rollers are tilted in relation thereto.

20. A parking device according to claim 19, wherein the quadrilateral linkages are so arranged that the tilt which they impart to the roller axes in the operative position is such as to ensure that the vertical planes containing the inclined roller axes meet substantially at the midpoint of the centre line of the other pair of wheels of the vehicle.

21. A parking device according to claim 13, wherein each jack-link is pivotally mounted at one end on the hub or axle assembly of the vehicle for pivotal movement about a substantially horizontal axis extending generally fore-and-aft of the vehicle, the said pivotal mounting thus forming the jacking abutment, and the lower and outer end of the respective rail is pivotally mounted in the other end of said jack-link.

22. A parking device according to claim 21, wherein each jack-link and the roller mounting member which engages the respective rail are provided with complementary elements adapted to co-operate as the roller mounting member approaches the operative position.

23. A parking device according to claim 22, wherein the complementary elements comprise rollers on the one end of each jack-link and a platform with an upstanding lip on the roller mounting member.

24. A parking device according to claim 23, wherein the complementary elements further comprise projections and recesses adapted to co-operate so as to resist relative sliding movement of the jack-links and roller mounting members.

25. A parking device according to claim 24, wherein a projection of hook or inverted T-shape is adapted to engage in a corresponding recess.

26. A parking device according to claim 1 wherein each rail is provided, at its upper and inner end, with a flexible support adapted to be attached to the vehicle.

27. A parking device according to claim 1 wherein the rails are of round-section metal rod or wire.

28. A parking device according to claim 27, wherein each rail, at its lower and outer end, is mounted so as to be slidable in a spherical bush on a respective jacking abutment.

29. A parking device according to claim 27, wherein each rail, near its lower and outer end, is bent back on itself before being secured in a respective jack-link.

30. A parking device according to claim 29, wherein a sharp reverse bend in the rail, just before it is bent back on itself, serves as a stop for rail-engaging rollers mounted on the roller mounting member.

31. A parking device according to claim 1, wherein the rails are of hollow construction with a longitudinal slot running for the full effective length of each rail, and each roller mounting member carries a runner which engages inside the respective rail.

32. A parking device according to claim 31, wherein the rails each have curved sides engaging upper and lower edge portions of the respective runner, and inturned flanges on the lower edges of the sides, said flanges defining said longitudinal slot between them.

33. A parking device according to claim 31, wherein the rails are each enclosed by flexible sealing means adapted to open to allow said runners to pass along their respective rails.

34. A parking device according to claim 32, wherein each said runner comprises a plurality of rollers mounted on a member which is journalled in a trunnion on the roller mounting member for rotation about an axis substantially perpendicular to the respective rail.

35. A parking device according to claim 3, wherein the mounting of each rail on the sprung part of the vehicle comprises a generally vertical shackle link whose lower end is pivoted on the sprung part of the vehicle and whose upper end is pivotally connected to the upper and inner end of the rail.

36. A parking device according to claim 1, wherein the extensible power means is a hydraulic ram.

37. A parking device according to claim 1, wherein a single retraction spring is provided for moving the assembly of rollers, roller mounting members and power means from the operative position to the retracted position, the spring having one relatively fixed end and a moving end which is connected through cables to the two roller mounting members so as to synchronise movements of the roller mounting members both on extension and on retraction.

38. A parking device according to claim 37 wherein the retraction spring is contained within a tube mounted parallel to the longitudinal axis of the vehicle and capable of fore-and-aft movement relative to the vehicle along longitudinal guide means, the cables from the roller mounting members each being led transversely across the vehicle and around a pulley mounted on one end of the spring tube and then extending through the spring tube to the moving end of the spring, whereby the spring tube follows the movements of the roller mounting members on extension or contraction and thereby maintains a substantially constant angle between the cables and the longitudinal axis.

39. A motor vehicle fitted with the parking device of claim 1.

* * * * *